United States Patent
Suresh et al.

(10) Patent No.: US 10,164,773 B2
(45) Date of Patent: Dec. 25, 2018

(54) ENERGY-EFFICIENT DUAL-RAIL KEEPERLESS DOMINO DATAPATH CIRCUITS

(71) Applicant: Intel Corporation, Santa Clara, CA (US)

(72) Inventors: Vikram B. Suresh, Hillsboro, OR (US); Sanu K. Mathew, Hillsboro, OR (US); Sudhir K. Satpathy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 124 days.

(21) Appl. No.: 15/282,232

(22) Filed: Sep. 30, 2016

(65) Prior Publication Data

US 2018/0097615 A1  Apr. 5, 2018

(51) Int. Cl.
*H04K 1/00* (2006.01)
*H04L 9/06* (2006.01)
*H03K 19/20* (2006.01)

(52) U.S. Cl.
CPC ........... *H04L 9/0643* (2013.01); *H03K 19/20* (2013.01)

(58) Field of Classification Search
CPC .............................. H04L 9/0643; H03K 19/20
USPC ............................................................. 380/28
See application file for complete search history.

(56) References Cited

U.S. PATENT DOCUMENTS

| | | | |
|---|---|---|---|
| 5,491,653 A | 2/1996 | Taborn et al. | |
| 6,223,199 B1 | 4/2001 | Petro et al. | |
| 6,466,960 B1 | 10/2002 | Winters | |
| 6,567,835 B1 | 5/2003 | Blomgren et al. | |
| 2002/0095642 A1 | 7/2002 | Karim et al. | |
| 2002/0130685 A1* | 9/2002 | Forbes | H03K 19/0963 326/98 |
| 2015/0303924 A1* | 10/2015 | Isozaki | H01L 27/092 327/541 |
| 2015/0326111 A1* | 11/2015 | Savage | H02M 3/06 327/306 |

OTHER PUBLICATIONS

International Search Report and Written Opinion for International Patent Application No. PCT/US2017/048826, dated Dec. 5, 2017

* cited by examiner

*Primary Examiner* — Mohammad W Reza
(74) *Attorney, Agent, or Firm* — Green, Howard & Mughal LLP

(57) ABSTRACT

Described is an apparatus comprising precharge paths including first clocked transistors having gates coupled to a clock signal path, first terminals coupled to a first power rail, and second terminals coupled to one or more first junction nodes. The precharge paths lack a keeper circuitry, have a configurable keeper circuitry, and/or have cross-coupled keeper circuitry to eliminate/reduce keeper contention during domino logic evaluation. The apparatus may comprise second clocked transistors having gates coupled to the clock signal path, first terminals coupled to one or more second junction nodes, and second terminals coupled to a second power rail. The apparatus may comprise sets of evaluation transistors having conducting channels coupled in series, coupled to the one or more first junction nodes, and coupled to one of the one or more second junction nodes. A NAND or inverter circuitry with inputs is coupled to the one or more first junction nodes.

19 Claims, 15 Drawing Sheets

ENERGY-EFFICIENT DUAL-RAIL KEEPERLESS DOMINO DATAPATH CIRCUITS

BACKGROUND

The digital currency Bitcoin employs a public ledger that captures all transactions occurring in the digital currency system in a chain of blocks. Each block added to the chain validates the transactions by compressing a Merkle root of the transactions along with information including a time stamp, a version, a target, and a hash of the previous block. The process of validating transactions and computing new blocks of the chain is known as mining.

Bitcoin mining includes the computationally expensive task of finding a 32-bit nonce, which is a value which, when appended to the Merkle root, the previous hash, and other headers, produces a 256-bit hash value using The Secure Hash Algorithm (SHA) 256 (SHA-256) that is less than a pre-determined threshold value. The SHA-256 based hashing operation may be the largest recurring cost incurred in the mining process.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Bitcoin is a digital currency used for peer-to-peer transactions. Bitcoin may eliminate a need for intermediate financial institutions by guaranteeing authenticity and user-anonymity using digital signatures. Bitcoin may solve the issue of "double spending" of digital currency by using the concept of block chaining, in which a public ledger may capture all transactions that occur in the digital currency system. Every block added to the chain may validate a new set of transactions by compressing a Merkle root of the transactions along with information including a time stamp, version, target and the hash of the previous block. The process of validating transactions and computing new blocks of the chain may be referred to as mining.

The most expensive operation in mining involves the computationally intensive task of finding a 32-bit nonce. When the nonce is appended to the Merkle root, the previous hash, and other headers, it may produce a 256-bit hash value which is less than a predetermined threshold value. The SHA-256 based hashing operation involved may incur the recurring cost in terms of energy used in the process of creating a Bitcoin. The incentive a miner receives for bitcoin mining may be offset by the energy cost for performing the mining computations. As a result, there is a strong motivation for developing energy-efficient hardware accelerators that reduce the energy consumed by the mining computations.

Figure 1:
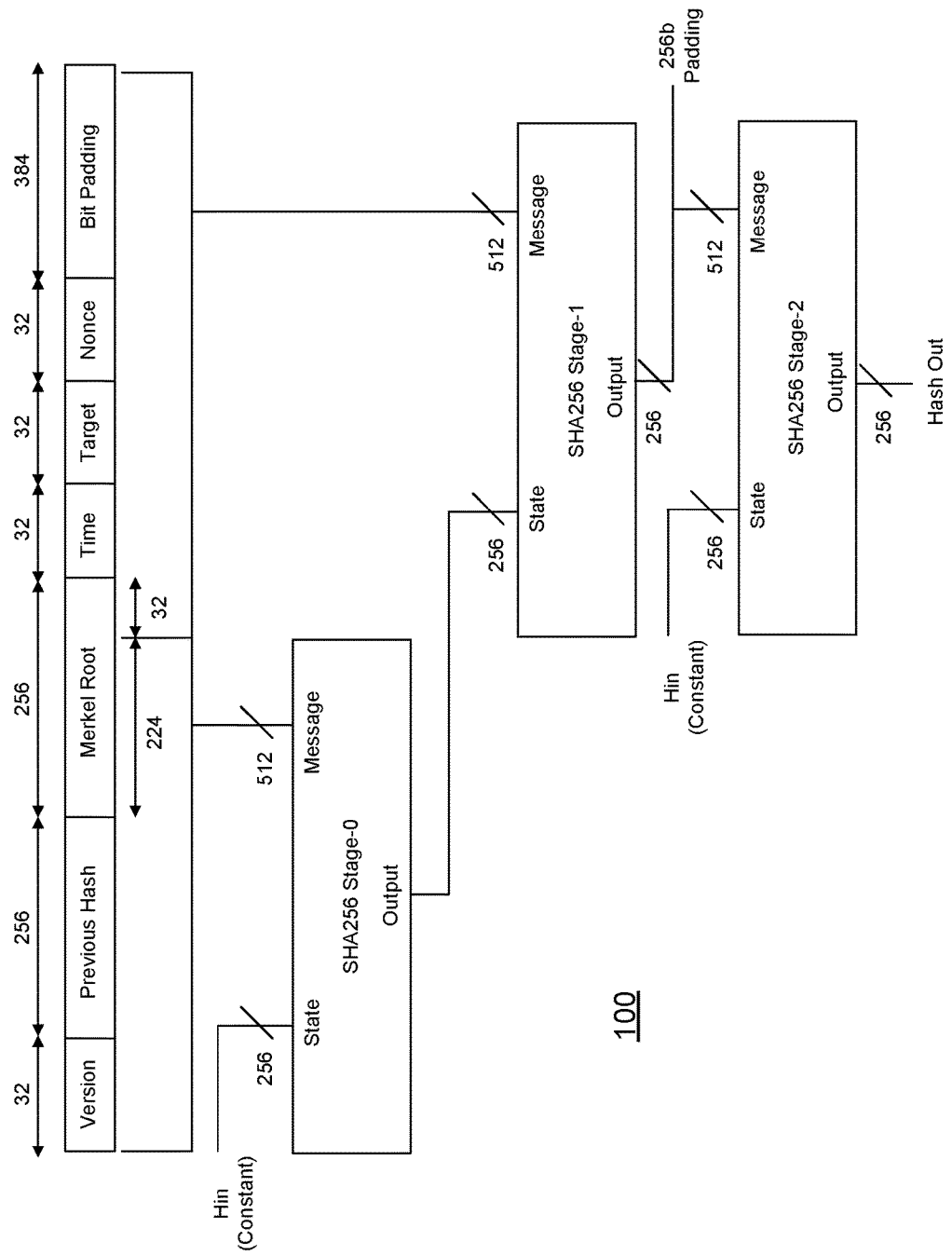
FIG. 1 illustrates a Bitcoin mining operation comprising various stages of Secure Hash Algorithm (SHA) 256 (SHA-256) hashing, in accordance with some embodiments of the disclosure.

FIG. 1 illustrates a Bitcoin mining operation comprising various stages of Secure Hash Algorithm (SHA) 256 (SHA-256) hashing, in accordance with some embodiments of the disclosure. A Bitcoin mining operation 100 may comprise two stages of SHA-256 hashing to compress a 1024-bit message, followed by another round of SHA-256 hashing of an intermediate hash. The 1024-bit message may consist of a 32-bit nonce that is incremented every cycle. A valid nonce may be found if the final hash contains a predefined number of leading zeros. A challenge for miners is to search through the entire nonce space, which is typically done in a brute force manner, while also minimizing energy consumption per hash and maximizing performance per watt.

Bitcoin mining is a brute force search of a large nonce space with a tiny success rate. Due to the nature of the process, Bitcoin mining may tolerate intermittent errors, such as intermittent errors due to domino-node charge leakage during ultra-low voltage operation. "False misses" will not improperly flag the tested nonce as being "invalid," and may simply result in proceeding to test further nonce values, while "false hits" may be detected upon validation of the nonce (which may consume proportionally infinitesimal resources) and may then be properly discarded.

Bitcoin mining may be performed on general-purpose Central Processing Units (CPUs) using optimized software, or on accelerated General-Purpose Graphics Processing Units (GPGPUs) or Field-Programmable Gate Array (FPGA) accelerator cards. More recently, Bitcoin mining has been performed on dedicated Application-Specific Integrated Circuits (ASICs) using multiple parallel SHA engines. Such ASICS may search Tera-hashes per second, but may also consume 200 watts or more. The amount of energy consumed per searched hash has accordingly become a critical metric for Bitcoin mining accelerators.

Since the Bitcoin mining operation may require high throughput, the SHA-256 datapath may be heavily pipelined, resulting in significant sequential power. Using domino style circuitry may provide an inherent latch within each logic cell, which may in turn eliminate a need for additional flops or latches. In addition, the performance of domino circuitry may advantageously enable voltage scaling and may thereby result in significant dynamic energy reduction. A high activity SHA-256 datapath may accordingly be an ideal candidate to harness the power-performance benefits of domino style circuitry. However, a high activity domino datapath may incur dynamic power overhead due to contention between keeper circuitry and pull-down circuitry during evaluation.

Disclosed herein are three types of dual-rail domino style circuitry based SHA-256 datapath circuits that address potential dynamic power overhead, and which may advantageously facilitate energy efficient Bitcoin mining. A first type of circuit may incorporate keeper-less dual-rail domino circuitry to eliminate keeper contention during logic evaluation, which may advantageously support high-frequency operation. A second type of circuit may incorporate dual-rail domino circuitry with configurable keepers to enable keeper devices only during low frequency operation, which may advantageously support frequency scaling. A third type of circuit may incorporate dual-rail domino circuitry with cross-coupled keepers to minimize keeper contention during logic evaluation.

In various embodiments, each of these three types of dual-rail domino style circuitry discussed herein may be employed individually or in combination to design energy-efficient hardware accelerator for Bitcoin mining. Full-custom dual-rail domino style datapaths based upon these circuitries may advantageously minimize sequential energy and improve voltage scaling due to the performance characteristics of domino style circuitry. The circuitries may provide, for example, a trade-off between the dynamic power overhead due to keeper contention and the scalability of operating frequency. In comparison with conventional static CMOS standard-cell based designs, the full custom dual-rail domino based Bitcoin mining circuits may provide 33% performance improvement, or 56% energy improvement, or both. The techniques proposed herein may accordingly provide significant energy savings in the process of Bitcoin mining at a cost of a negligible loss in mining success rate.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Figure 2:
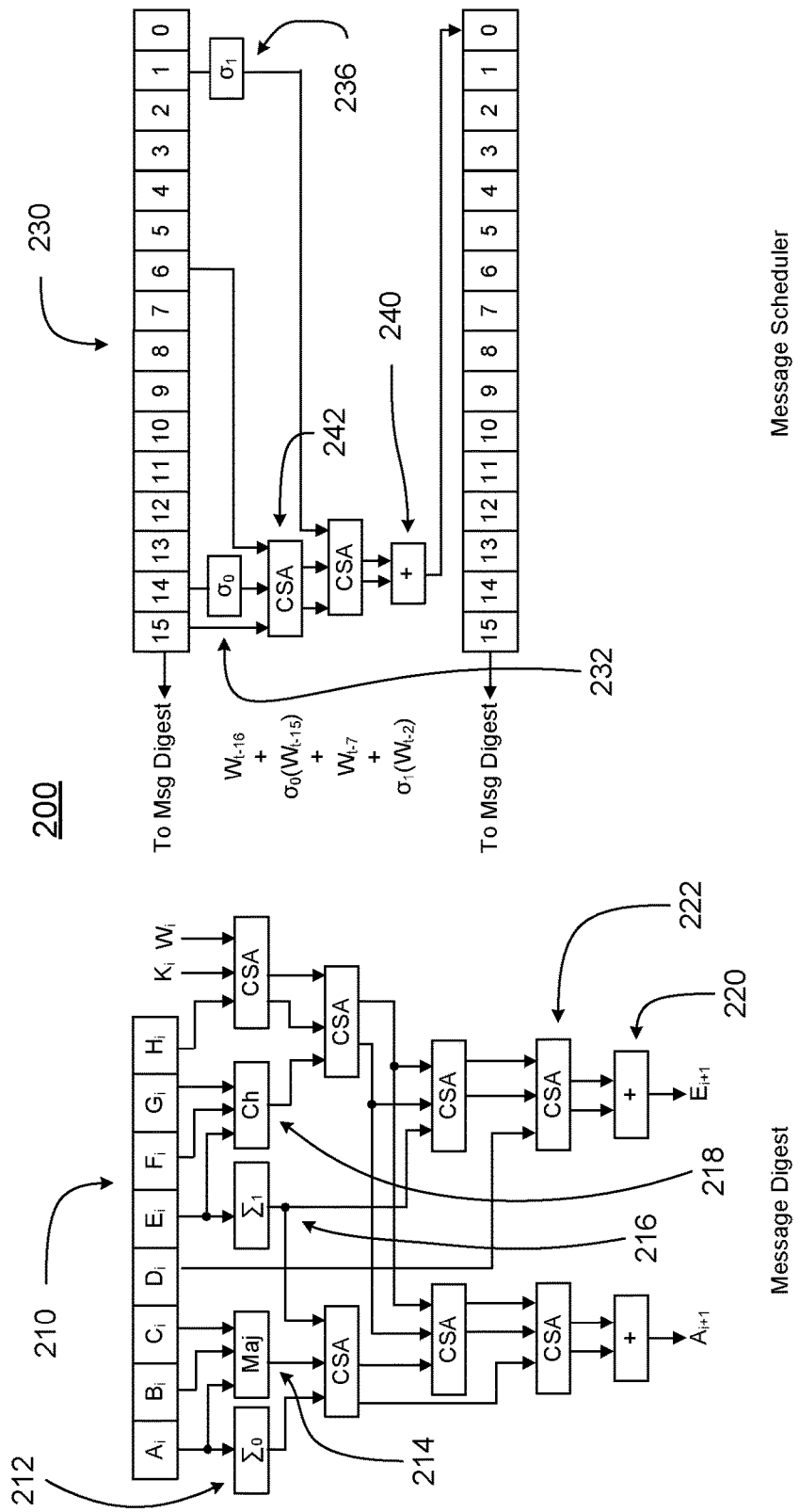
FIG. 2 illustrates a SHA-256 message digest datapath and a SHA-256 message scheduler datapath, in accordance with some embodiments of the disclosure.

A specific aspect of hardware used for Bitcoin mining may be a Secure Hash Algorithm (SHA) 256 (SHA-256) datapath. FIG. 2 illustrates a SHA-256 message digest datapath and a SHA-256 message scheduler datapath, in accordance with some embodiments of the disclosure. SHA-256 datapath 200 may comprise a message digest datapath 210 and a message scheduler datapath 230.

A processing engine in a Bitcoin mining accelerator may exercise message digest datapath 210 and message scheduler datapath 230 over numerous rounds (e.g., 220 rounds in some embodiments). In some embodiments, message digest datapath 210 and/or message scheduler datapath 230 may employ a bit-sliced design.

Message digest datapath 210 may comprise: one or more first circuitries 212, which may be operable to perform a "$\Sigma_0$" calculation; one or more second circuitries 214, which may be operable to perform a "Maj" calculation; one or more third circuitries 216, which may be operable to perform a "$\Sigma_1$" calculation; one or more fourth circuitries 218, which may be operable to perform a "Ch" calculation; and/or one or more fifth circuitries 220, which may be operable to perform a "+" calculation (e.g., an addition with carry propagation operation); and one or more sixth circuitries 222, which may be operable to perform one or more "CSA" calculations (e.g., carry-save addition calculations). These operations may be performed on internal states $A_i$ through $H_i$, an expanded message word $W_i$, a round constant $K_i$, and/or on outputs of first circuitries 212 through sixth circuitries 222 (for example, as depicted in FIG. 2).

Message scheduler datapath 230 may comprise: one or more first circuitries 232, which may be operable to perform a "$\sigma_0$" calculation; one or more second circuitries 236, which may be operable to perform a "$\sigma_1$" calculation; one or more third 240, which may be operable to perform a "+" calculation (e.g., an addition with carry propagation operation); and one or more fourth circuitries 242, which may be operable to perform one or more "CSA" calculations (e.g., carry-save addition calculations). These operations may be performed on portions 0 through 15 of a message word, and/or on outputs of first circuitries 232 through fourth circuitries 242 (for example, as depicted in FIG. 2).

Various calculations performed by first circuitries 212 through sixth circuitries 222 may employ an XOR function. In addition, various calculations performed by first circuitries 232 through fourth circuitries 242 may employ an XOR function. At least in part due to their use of XOR functions, these circuitries may advantageously employ dual-rail domino logic.

Although the designs discussed herein may be directed toward CSA circuitries (for generating, e.g., sum bits and carry bits), they may also be applicable to the other circuitries discussed herein within the SHA datapaths. For example, although FIGS. 3-6 and 8-11 depict dual-rail domino circuitries for calculating Boolean sum-of-products sum-bit, inverse sum-bit, carry-bit, and inverse carry-bit values for CSA circuitries, the corresponding elements and structures may be modified to accept alternate inputs and/or to perform alternate Boolean sum-of-products calculations for calculating any of a variety of Boolean sums-of-products.

Accordingly, the circuitries may perform Boolean sum-of-products calculations for outputs of a "$\Sigma_0$" calculation, a "Maj" calculation, a "$\Sigma_1$" calculation, a "Ch" calculation, and/or a "+" calculation (as discussed above regarding message digest datapath 210). In addition, the circuitries may perform Boolean sum-of-products calculations for outputs of a "$\sigma_0$" calculation, a "$\sigma_1$" calculation, and/or a "+" calculation (as discussed above regarding message scheduler datapath 230).

Figure 3:
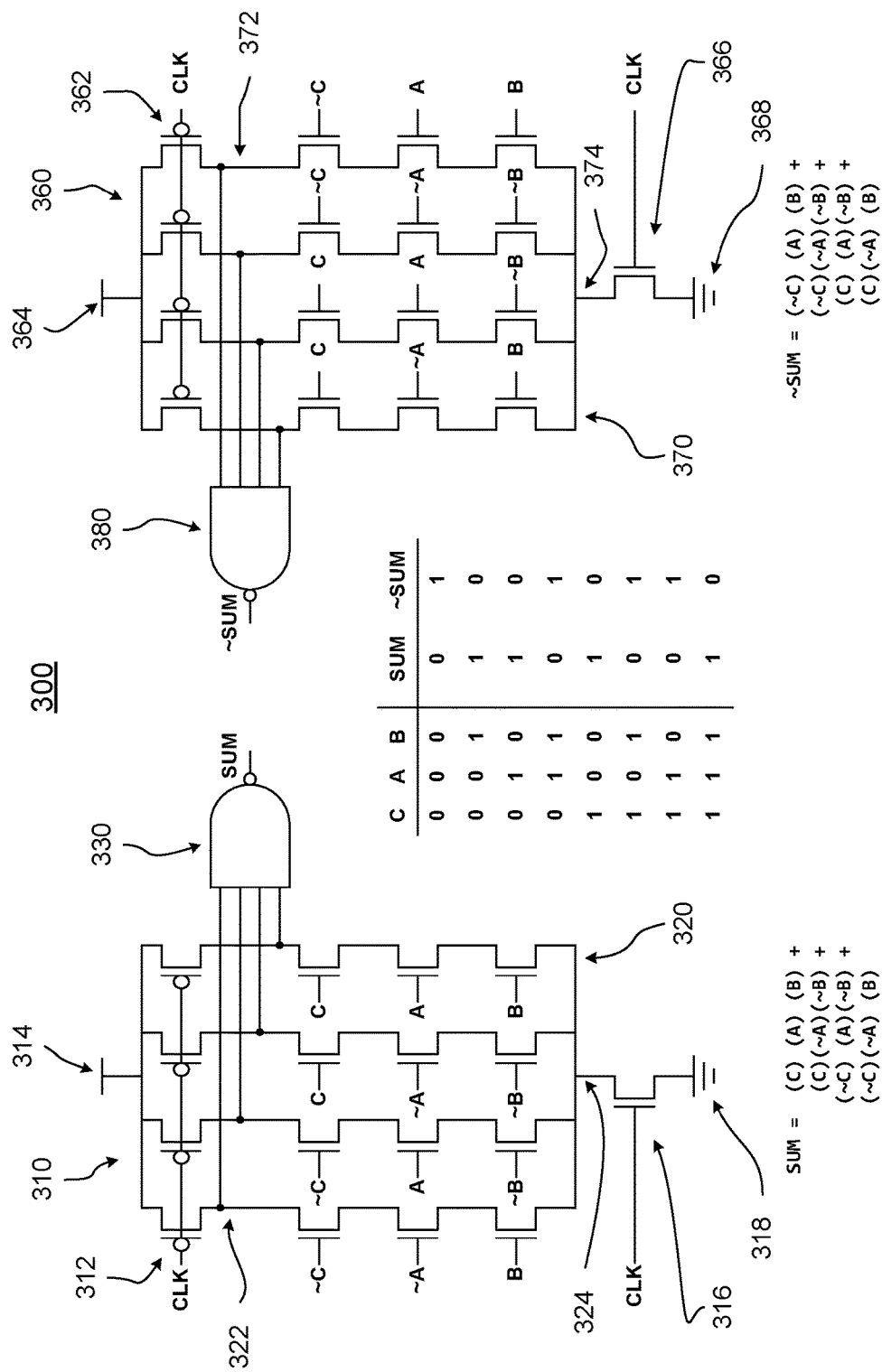
FIG. 3 illustrates dual-rail keeper-less domino circuitry for a Carry Save Adder (CSA) sum bit, in accordance with some embodiments of the disclosure.
Figure 4:
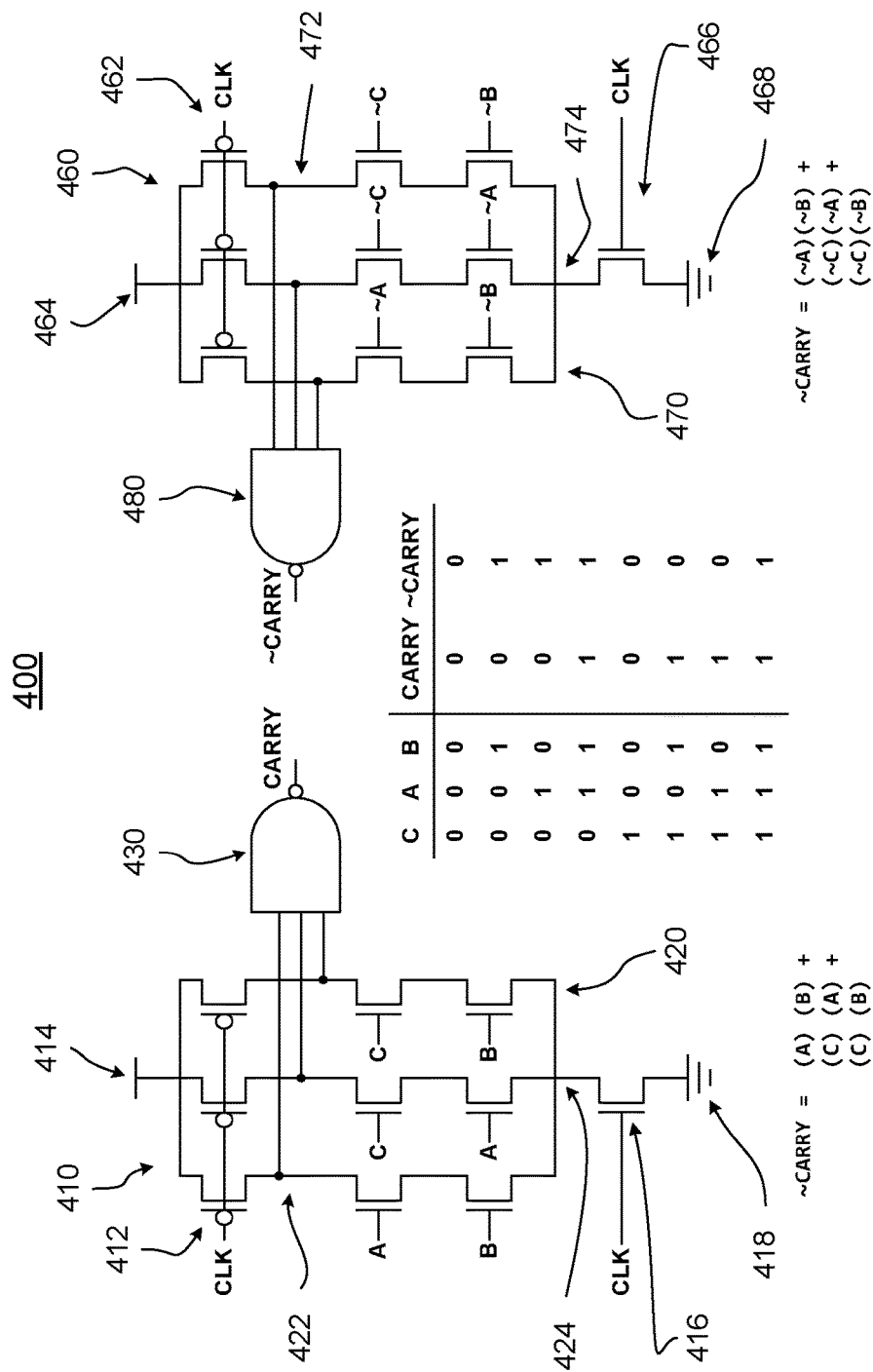
FIG. 4 illustrates dual-rail keeper-less domino circuitry for a CSA carry bit, in accordance with some embodiments of the disclosure.

FIG. 3 illustrates dual-rail keeper-less domino circuitry for a CSA sum bit, in accordance with some embodiments of the disclosure. FIG. 4 illustrates dual-rail keeper-less domino circuitry for a CSA carry bit, in accordance with some embodiments of the disclosure.

The keeper-less domino circuit may behave similar to a conventional domino circuit during the pre-charge and evaluate phases. However, the pull-down logic may not be subject to keeper-contention, which may result in lower short circuit power and/or increased performance. The performance improvement may be converted to energy savings by scaling the operating voltage.

Keeper-less domino circuitry may have lesser scalability in operating frequency relative to domino circuitry incorporating keeper logic. Junction nodes of the pre-charge and pull-down circuits may leak over time, and may cause bits at the output to flip, resulting in functional failure. However, for Bitcoin mining accelerators, the circuit will most likely be operated at the highest possible frequency for a given supply voltage for purposes of maximizing throughput, thereby enabling frequent pre-charge/evaluate cycles. In extreme cases, a bit-flip due to charge leakage may introduce a functional error. However, the minute success rates of the Bitcoin mining algorithm provide tolerance to such rare functional failures.

With respect to FIG. 3, CSA sum bit circuitry 300 may comprise a sum bit circuitry 310 and an inverse-sum bit circuitry 360. Sum bit circuitry 310 may be operable to calculate a CSA sum bit, and inverse-sum bit 360 may be operable to calculate an inverse of CSA sum bit.

Sum bit circuitry 310 may comprise one or more pre-charge paths comprising one or more respectively corresponding first clocked transistors 312, one or more evaluation paths comprising both one or more respectively corresponding sets of evaluation transistors 320 and one or more second clocked transistors 316, and a NAND circuitry 330.

First clocked transistors 312 may have gates coupled to a clock signal path, first terminals coupled to a first power rail 314, and second terminals coupled to one or more respectively corresponding first junction nodes 322. First power rail 314 may be operable to carry a positive supplied voltage. The one or more first clocked transistors may be p-type Metal Oxide Semiconductor Field Effect Transistors (MOSFETs).

The one or more precharge paths of sum bit circuitry 310 may lack a keeper circuitry. In various embodiments, the one or more precharge paths may extend between first power rail 314 and the one or more respectively corresponding first junction nodes 322, and may consist of the one or more respectively corresponding first clocked transistors 312. As a result, sum bit circuitry 310 may not comprise keeper circuitry between the one or more first junction nodes 322 and the one or more respectively corresponding first clocked transistors 312.

Second clocked transistors 316 may have gates coupled to the clock signal path, first terminals coupled to one or more respectively corresponding second junction nodes 324, and second terminals coupled to a second power rail 318. Second power rail 318 may be operable to carry a negative supplied voltage. In some embodiments, sum bit circuitry 310 may have a single second junction node 324, and second clocked transistors 316 may consist of a single transistor. For some embodiments, sum bit circuitry 310 may have a second clocked transistor 316 corresponding to each of a plurality of sets of evaluation transistors 320. The one or more second clocked transistors may be n-type MOSFETs.

Sets of evaluation transistors 320 may have conducting channels coupled in series, coupled to the one or more respectively corresponding first junction nodes 322, and coupled to one of the one or more second junction nodes 324. Each set of evaluation transistors 320 may have one or more evaluation transistors with conducting channels extending between first junction nodes 322 and second junction nodes 324. The one or more sets of evaluation transistors may comprise n-type MOSFETs.

The one or more sets of evaluation transistors 320 may have gates coupled to at least one of a first number-bit input (A), an inverse first number-bit input (~A), a second number-bit input (B), an inverse second number-bit input (~B), a carry-bit input (C), and an inverse carry-bit input (~C). The one or more sets of evaluation transistors may be operable to calculate product terms for a Boolean sum-of-products sum-bit calculation and present the calculated product terms on first junction nodes 322. Meanwhile, NAND circuitry 330 may have inputs coupled to first junction nodes 322, and may be operable to calculate a sum of a Boolean sum-of-products sum-bit calculation, based upon the calculated product terms on first junction nodes 322. Accordingly, NAND circuitry 330 may be operable to drive a calculated sum-bit on a sum-bit output. Although FIG. 3 (and FIGS. 4-6 and 8-10) depict NAND circuitry for calculating sums of Boolean sum-of-product calculations, in some embodiments, one or more of first junction nodes 222 may be coupled to each other (e.g., may be shorted to each other) and may be connected or otherwise coupled to an input of an inverter circuitry.

Inverse-sum bit circuitry 360 may comprise one or more additional precharge paths comprising one or more respectively corresponding additional first clocked transistors 362, one or more additional evaluation paths comprising both one or more respectively corresponding additional sets of evaluation transistors 370 and one or more additional second clocked transistors 366, and a NAND circuitry 380.

Additional first clocked transistors 362 may have gates coupled to the clock signal path, first terminals coupled to a first power rail 364, and second terminals coupled to one or more respectively corresponding additional first junction nodes 372. First power rail 364 may be operable to carry a positive supplied voltage. The one or more first clocked transistors may be p-type MOSFETs.

The one or more additional precharge paths of inverse sum bit circuitry 360 may lack a keeper circuitry. In various embodiments, the one or more additional precharge paths may extend between first power rail 364 and the one or more respectively corresponding additional first junction nodes 372, and may consist of the one or more respectively corresponding additional first clocked transistors 362. As a result, inverse sum bit circuitry 360 may not comprise keeper circuitry between the one or more additional first junction nodes 372 and the one or more respectively corresponding additional first clocked transistors 362.

Additional second clocked transistors 366 may have gates coupled to the clock signal path, first terminals coupled to one or more respectively corresponding additional second junction nodes 374, and second terminals coupled to a second power rail 368. Second power rail 368 may be operable to carry a negative supplied voltage. In some embodiments, inverse sum bit circuitry 360 may have a single second junction node 374, and additional second clocked transistors 366 may consist of a single transistor. For some embodiments, inverse sum bit circuitry 360 may have an additional second clocked transistor 366 corresponding to each of a plurality of additional sets of evaluation transistors 370. The one or more additional second clocked transistors may be n-type MOSFETs.

Additional sets of evaluation transistors 370 may have conducting channels coupled in series, coupled to the one or more respectively corresponding additional first junction nodes 372, and coupled to one of the one or more additional second junction nodes 374. Each additional set of evaluation transistors 370 may have one or more evaluation transistors with conducting channels extending between additional first junction nodes 372 and additional second junction nodes 374. The one or more additional sets of evaluation transistors may comprise n-type MOSFETs.

The one or more additional sets of evaluation transistors 370 may have gates coupled to at least one of a first number-bit input (A), an inverse first number-bit input (~A), a second number-bit input (B), an inverse second number-bit input (~B), a carry-bit input (C), and an inverse carry-bit input (~C). The one or more additional sets of evaluation transistors 370 may be operable to calculate product terms for a Boolean sum-of-products inverse sum-bit calculation and present the calculated product terms on additional first junction nodes 372. Meanwhile, NAND circuitry 380 may have inputs coupled to additional first junction nodes 372, and may be operable to calculate a sum of a Boolean sum-of-products inverse sum-bit calculation, based upon the calculated product terms on additional first junction nodes 372. Accordingly, NAND circuitry 380 may be operable to drive a calculated inverse sum-bit on an inverse sum-bit output.

With respect to FIG. 4, CSA carry bit circuitry 400 may comprise a carry bit circuitry 410 and an inverse-carry bit circuitry 460. Carry bit circuitry 410 may be operable to calculate a CSA carry bit, and inverse-carry bit circuitry 460 may be operable to calculate an inverse of CSA carry bit.

Carry bit circuitry 410 may comprise one or more precharge paths comprising one or more respectively corresponding first clocked transistors 412, one or more evaluation paths comprising both one or more respectively corresponding sets of evaluation transistors 420 and one or more second clocked transistors 416, and a NAND circuitry 430.

First clocked transistors 412 may have gates coupled to a clock signal path, first terminals coupled to a first power rail 414, and second terminals coupled to one or more respectively corresponding first junction nodes 422. First power rail 414 may be operable to carry a positive supplied voltage. The one or more first clocked transistors may be p-type Metal Oxide Semiconductor Field Effect Transistors (MOSFETs).

The one or more precharge paths of carry bit circuitry 410 may lack a keeper circuitry. In various embodiments, the one or more precharge paths may extend between first power rail 414 and the one or more respectively corresponding first junction nodes 422, and may consist of the one or more respectively corresponding first clocked transistors 412. As a result, carry bit circuitry 410 may not comprise keeper circuitry between the one or more first junction nodes 422 and the one or more respectively corresponding first clocked transistors 412.

Second clocked transistors 416 may have gates coupled to the clock signal path, first terminals coupled to one or more respectively corresponding second junction nodes 424, and second terminals coupled to a second power rail 418. Second power rail 418 may be operable to carry a negative supplied voltage. In some embodiments, carry bit circuitry 410 may have a single second junction node 424, and second clocked transistors 416 may consist of a single transistor. For some embodiments, carry bit circuitry 410 may have a second clocked transistor 416 corresponding to each of a plurality of sets of evaluation transistors 420. The one or more second clocked transistors may be n-type MOSFETs.

Sets of evaluation transistors 420 may have conducting channels coupled in series, coupled to the one or more respectively corresponding first junction nodes 422, and coupled to one of the one or more second junction nodes 424. Each set of evaluation transistors 420 may have one or more evaluation transistors with conducting channels extending between first junction nodes 422 and second junction nodes 424. The one or more sets of evaluation transistors may comprise n-type MOSFETs.

The one or more sets of evaluation transistors 420 may have gates coupled to at least one of a first number-bit input (A), an inverse first number-bit input (~A), a second number-bit input (B), an inverse second number-bit input (~B), a carry-bit input (C), and an inverse carry-bit input (~C). The one or more sets of evaluation transistors may be operable to calculate product terms for a Boolean sum-of-products carry-bit calculation and present the calculated product terms on first junction nodes 422. Meanwhile, NAND circuitry 430 may have inputs coupled to first junction nodes 422, and may be operable to calculate a sum of a Boolean sum-of-products carry-bit calculation, based upon the calculated product terms on first junction nodes 422. Accordingly, NAND circuitry 430 may be operable to drive a calculated carry-bit on a carry-bit output.

Inverse-carry bit circuitry 460 may comprise one or more additional precharge paths comprising one or more respectively corresponding additional first clocked transistors 462, one or more additional evaluation paths comprising both one or more respectively corresponding additional sets of evaluation transistors 470 and one or more additional second clocked transistors 466, and a NAND circuitry 480.

Additional first clocked transistors 462 may have gates coupled to the clock signal path, first terminals coupled to a first power rail 464, and second terminals coupled to one or more respectively corresponding additional first junction nodes 472. First power rail 464 may be operable to carry a positive supplied voltage. The one or more first clocked transistors may be p-type MOSFETs.

The one or more additional precharge paths of inverse carry bit circuitry 460 may lack a keeper circuitry. In various embodiments, the one or more additional precharge paths may extend between first power rail 464 and the one or more respectively corresponding additional first junction nodes 472, and may consist of the one or more respectively corresponding additional first clocked transistors 462. As a result, inverse carry bit circuitry 460 may not comprise keeper circuitry between the one or more additional first junction nodes 472 and the one or more respectively corresponding additional first clocked transistors 462.

Additional second clocked transistors 466 may have gates coupled to the clock signal path, first terminals coupled to one or more respectively corresponding additional second junction nodes 474, and second terminals coupled to a second power rail 468. Second power rail 468 may be operable to carry a negative supplied voltage. In some embodiments, inverse carry bit circuitry 460 may have a single second junction node 474, and additional second clocked transistors 466 may consist of a single transistor. For some embodiments, inverse carry bit circuitry 460 may have an additional second clocked transistor 466 corresponding to each of a plurality of additional sets of evaluation transistors 470. The one or more additional second clocked transistors may be n-type MOSFETs.

Additional sets of evaluation transistors 470 may have conducting channels coupled in series, coupled to the one or more respectively corresponding additional first junction nodes 472, and coupled to one of the one or more additional second junction nodes 474. Each additional set of evaluation transistors 470 may have one or more evaluation transistors with conducting channels extending between additional first junction nodes 472 and additional second junction nodes 474. The one or more additional sets of evaluation transistors may comprise n-type MOSFETs.

The one or more additional sets of evaluation transistors 470 may have gates coupled to at least one of a first number-bit input (A), an inverse first number-bit input (~A), a second number-bit input (B), an inverse second number-bit input (~B), a carry-bit input (C), and an inverse carry-bit input (~C). The one or more additional sets of evaluation transistors 470 may be operable to calculate product terms for a Boolean sum-of-products inverse carry-bit calculation and present the calculated product terms on additional first junction nodes 472. Meanwhile, NAND circuitry 480 may have inputs coupled to additional first junction nodes 472, and may be operable to calculate a sum of a Boolean sum-of-products inverse carry-bit calculation, based upon the calculated product terms on additional first junction nodes 472. Accordingly, NAND circuitry 480 may be operable to drive a calculated inverse carry-bit on an inverse carry-bit output.

Figure 5:
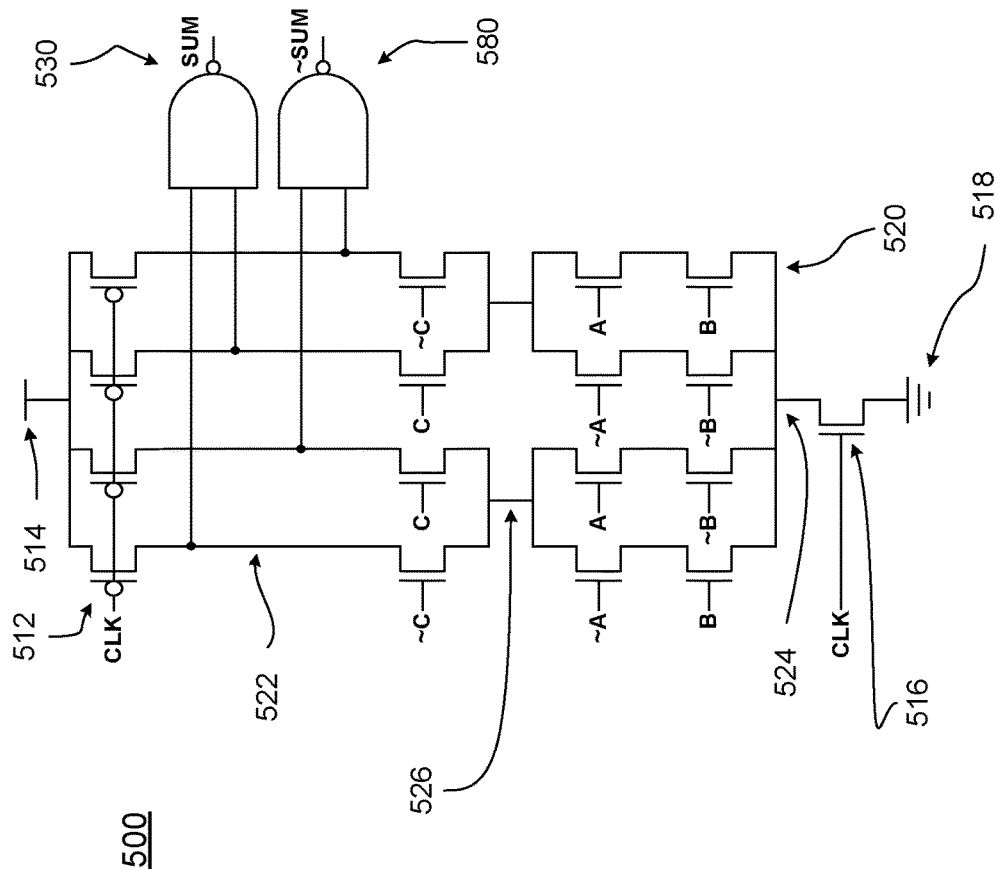
FIG. 5 illustrates dual-rail keeper-less domino circuitry for a CSA sum bit, in accordance with some embodiments of the disclosure.
Figure 6:
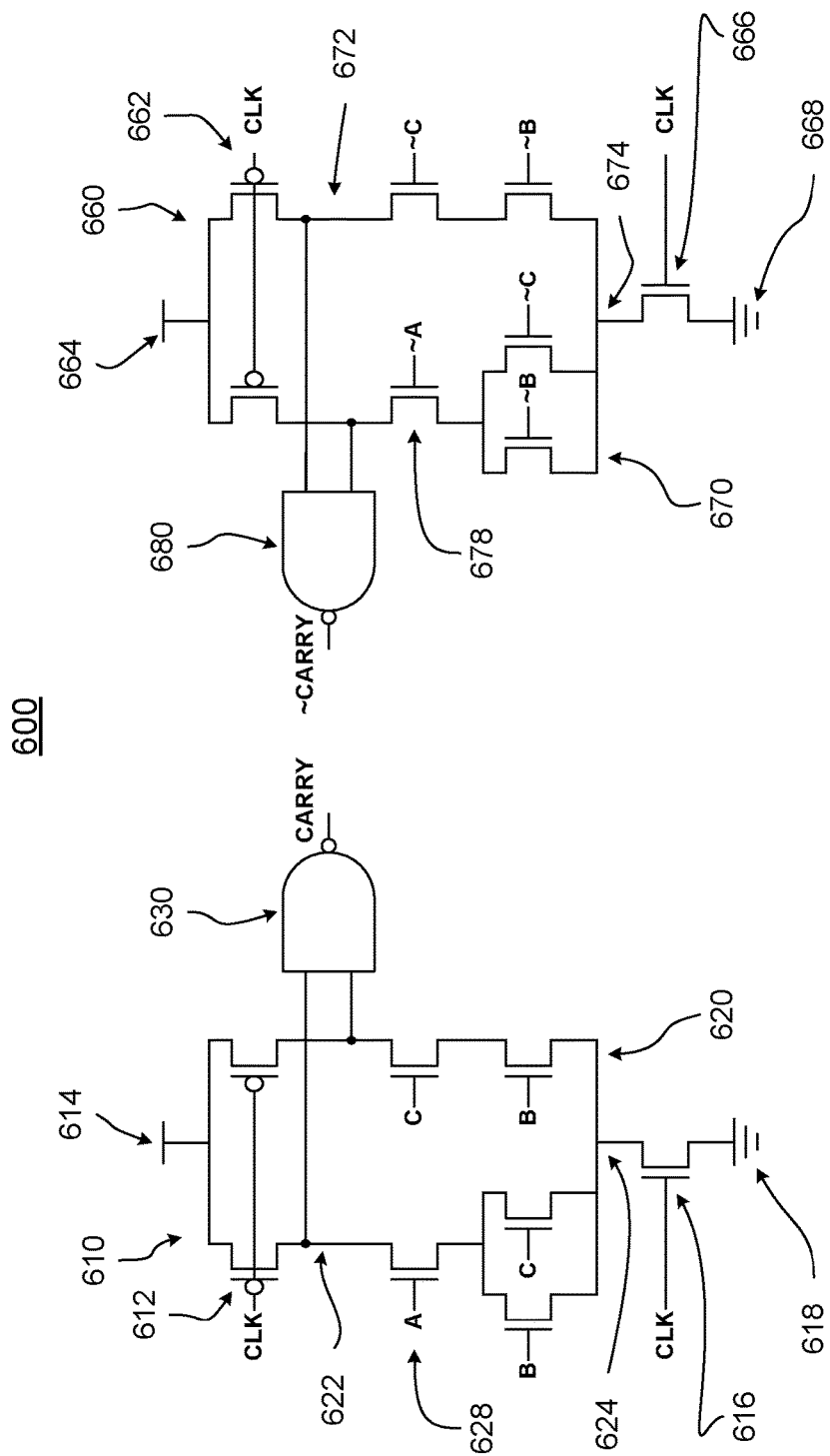
FIG. 6 illustrates dual-rail keeper-less domino circuitry for a CSA carry bit, in accordance with some embodiments of the disclosure.

FIG. 5 illustrates dual-rail keeper-less domino circuitry for a CSA sum bit, in accordance with some embodiments of the disclosure. FIG. 6 illustrates dual-rail keeper-less domino circuitry for a CSA carry bit, in accordance with some embodiments of the disclosure.

With respect to FIG. 5, CSA sum bit circuitry 500 may be operable to calculate a CSA sum bit, and an inverse CSA sum bit. In addition, in comparison with CSA sum bit circuitry 300, CSA sum bit circuitry 500 may share resources between the circuitry for calculating a sum-bit and the circuitry for calculating an inverse sum-bit.

Sum bit circuitry 500 may comprise one or more precharge paths comprising one or more respectively corresponding first clocked transistors 512, one or more evaluation paths comprising both one or more respectively corresponding sets of evaluation transistors 520 and one or more second clocked transistors 516, a NAND circuitry 530, and a NAND circuitry 580.

First clocked transistors 512 may have gates coupled to a clock signal path, first terminals coupled to a first power rail 514, and second terminals coupled to one or more respectively corresponding first junction nodes 522. Second clocked transistors 516 may have gates coupled to the clock signal path, first terminals coupled to one or more respectively corresponding second junction nodes 524, and second terminals coupled to a second power rail 518. The one or more sets of evaluation transistors 520 may have gates coupled to at least one of a first number-bit input (A), an inverse first number-bit input (~A), a second number-bit input (B), an inverse second number-bit input (~B), a carry-bit input (C), and an inverse carry-bit input (~C).

NAND circuitry 530 may have inputs coupled to the first set of first junction nodes 522, while NAND circuitry 580 may have inputs coupled to the second set of first junction nodes 522. Accordingly, NAND circuitry 530 may be operable to drive a calculated sum-bit on a sum-bit output, while NAND circuitry 580 may be operable to drive a calculated inverse sum-bit on an inverse sum-bit output.

Various elements of CSA sum bit circuitry 500 may be substantially similar to elements of CSA sum bit circuitry 300. Various elements of CSA sum bit circuitry 500 may be arranged in a manner substantially similar to the arrangement of similar elements of CSA sum bit circuitry 300.

In comparison with CSA sum bit circuitry 300, CSA sum bit circuitry 500 may comprise intermediate junction nodes 526 between junction nodes 522 and portions of sets of evaluation transistors 520. In addition, in comparison with CSA sum bit circuitry 300, one or more sets of evaluation transistors may be operable to calculate product terms for a Boolean sum-of-products sum-bit calculation and present the calculated product terms on a corresponding first set of first junction nodes 322, and one or more sets of evaluation transistors may be operable to calculate product terms for a Boolean sum-of-products inverse sum-bit calculation and present the calculated product terms on a corresponding second set of first junction nodes 322. Accordingly, a first set of evaluation transistors and a second set of evaluation transistors may share at least one evaluation transistor.

With respect to FIG. 6, CSA carry bit circuitry 600 may be operable to calculate a CSA carry bit and an inverse CSA carry bit. In addition, in comparison with CSA carry bit circuitry 400, CSA carry bit circuitry 600 may share resources within the circuitry for calculating a carry-bit and within the circuitry for calculating an inverse carry-bit.

Carry bit circuitry 610 may comprise one or more precharge paths comprising one or more respectively corresponding first clocked transistors 612, one or more evaluation paths comprising both one or more respectively corresponding sets of evaluation transistors 620 and one or more second clocked transistors 616, and a NAND circuitry 630.

First clocked transistors 612 may have gates coupled to a clock signal path, first terminals coupled to a first power rail 614, and second terminals coupled to one or more respectively corresponding first junction nodes 622. Second clocked transistors 616 may have gates coupled to the clock signal path, first terminals coupled to one or more respectively corresponding second junction nodes 624, and second terminals coupled to a second power rail 618. The one or more sets of evaluation transistors 620 may have gates coupled to at least one of a first number-bit input (A), an inverse first number-bit input (~A), a second number-bit input (B), an inverse second number-bit input (~B), a carry-bit input (C), and an inverse carry-bit input (~C).

Inverse-carry bit circuitry 660 may comprise one or more additional precharge paths comprising one or more respectively corresponding additional first clocked transistors 662, one or more additional evaluation paths comprising both one or more respectively corresponding additional sets of evaluation transistors 670 and one or more additional second clocked transistors 666, and a NAND circuitry 680.

Additional first clocked transistors 662 may have gates coupled to the clock signal path, first terminals coupled to a first power rail 664, and second terminals coupled to one or more respectively corresponding additional first junction nodes 672. Additional second clocked transistors 666 may have gates coupled to the clock signal path, first terminals coupled to one or more respectively corresponding additional second junction nodes 674, and second terminals coupled to a second power rail 668. The one or more additional sets of evaluation transistors 670 may have gates coupled to at least one of a first number-bit input (A), an inverse first number-bit input (~A), a second number-bit input (B), an inverse second number-bit input (~B), a carry-bit input (C), and an inverse carry-bit input (~C).

Various elements of CSA carry bit circuitry 600 may be substantially similar to elements of CSA carry bit circuitry 400. Various elements of CSA carry bit circuitry 600 also be arranged in a manner substantially similar to the arrangement of similar elements of CSA carry bit circuitry 400.

In comparison with CSA carry bit circuitry 400, some transistors 628 out of the one or more sets of evaluation transistors 620 may be shared between sets of transistors. In addition, some transistors 678 out of the one or more sets of evaluation transistors 670 may be shared between sets of transistors.

Figure 7:
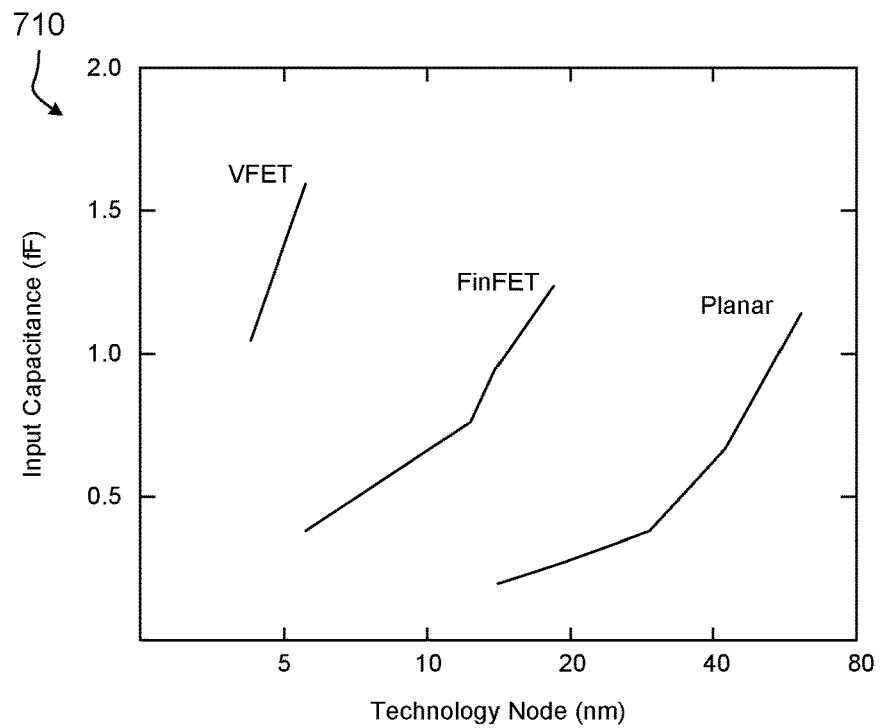
FIG. 7 illustrates relationships between silicon process technologies and capacitance, in accordance with some embodiments of the disclosure.
Figure 7:
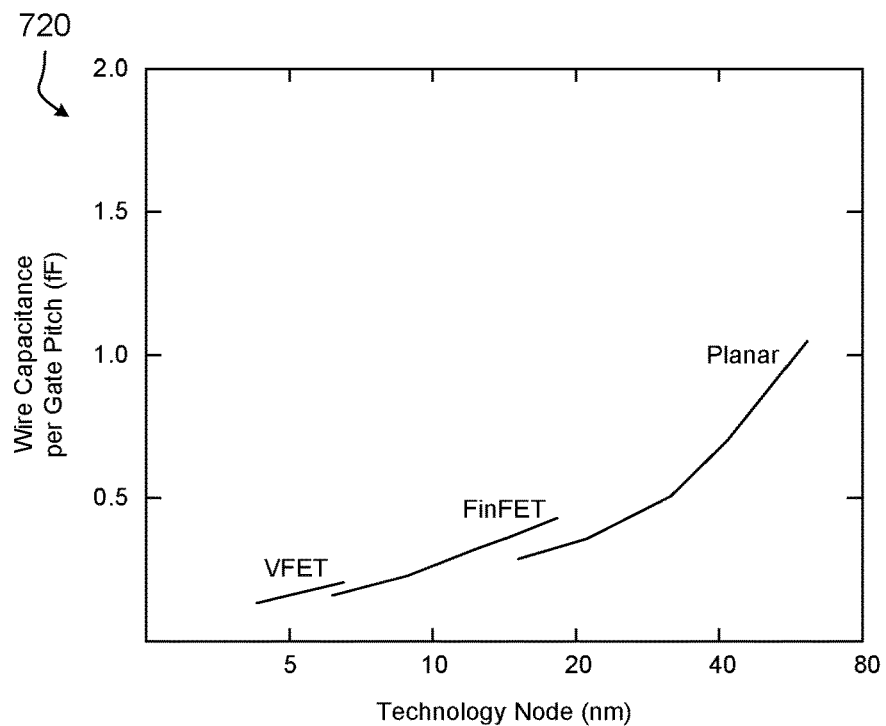

FIG. 7 illustrates relationships between silicon process technologies and capacitance, in accordance with some embodiments of the disclosure. Chart 710 depicts a relationship between input capacitance and feature size at various technology nodes, for various silicon manufacturing processes. Chart 720 depicts a relationship between input capacitance and feature size at various technology nodes, for various silicon manufacturing processes.

As silicon manufacturing processes improve, feature sizes decrease. As chart 710 and chart 720 show, input capacitance and wire capacitance decrease as feature sizes decrease. As devices and the capacitances associated with them become smaller, the capacitances may decrease, and the devices themselves may leak charge more quickly.

As a result, as silicon manufacturing processes improves, the importance of keepers increases in order to prevent loss of state. However, the tolerance of the Bitcoin mining process to occasional errors, combined with the custom nature of the Bitcoin mining accelerator designs, may render keeper-less dual-rail domino circuitry advantageous for purposes of Bitcoin mining.

Figure 8:
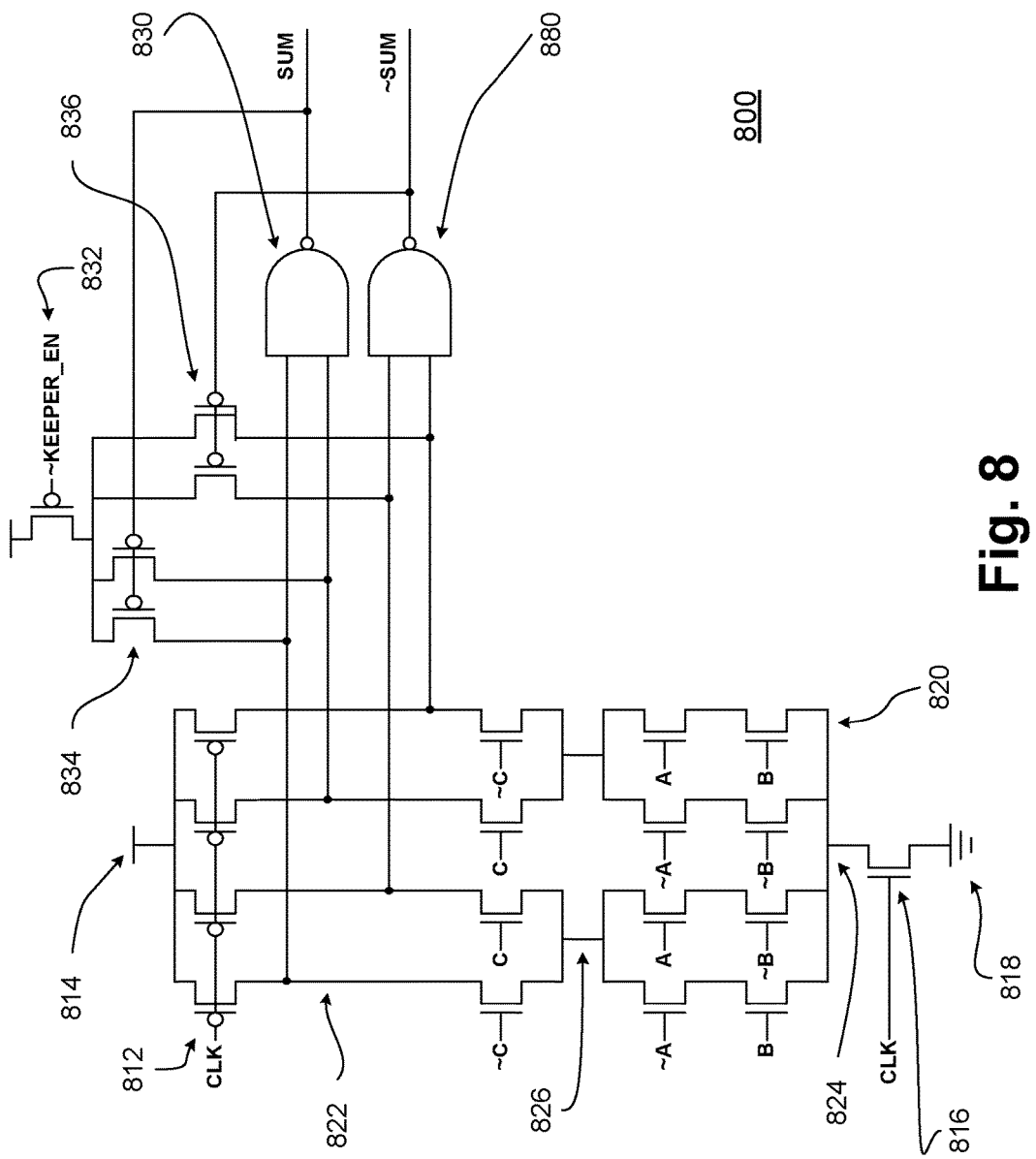
FIG. 8 illustrates dual-rail domino circuitry with configurable keepers for a CSA sum bit, in accordance with some embodiments of the disclosure.
Figure 9:
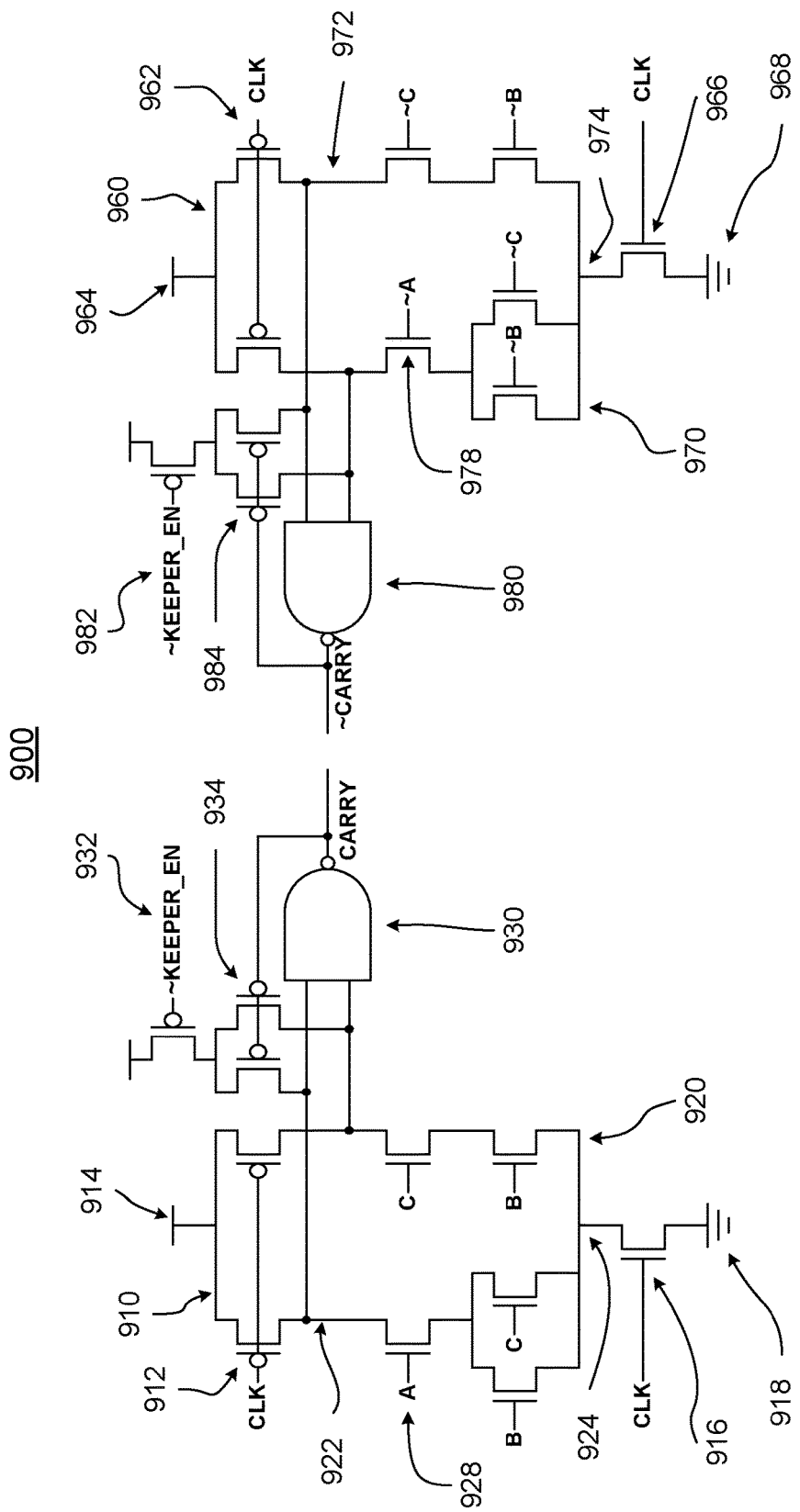
FIG. 9 illustrates dual-rail domino circuitry with configurable keepers for a CSA carry bit, in accordance with some embodiments of the disclosure.

FIG. 8 illustrates dual-rail domino circuitry with configurable keepers for a CSA sum bit, in accordance with some embodiments of the disclosure. FIG. 9 illustrates dual-rail domino circuitry with configurable keepers for a CSA carry bit, in accordance with some embodiments of the disclosure.

Configurable keepers may use keeper devices and additional header p-type MOSFET devices to control the keeper functionality. At high frequency operation, a keeper enable signal may be configured to disable the keeper devices. This may eliminate keeper contention during logic evaluation. At low frequency operation, the keeper enable signal may be configured to enable the keeper devices for more reliable operation. The keeper enable signal may be non-critical (and may accordingly be implemented under relaxed timing constraints). In addition, the header p-type MOSFET devices may be shared across multiple cells to reduce area overhead.

With respect to FIG. 8, CSA sum bit circuitry 800 may be operable to calculate a CSA sum bit, and an inverse CSA sum bit. In addition, in comparison with CSA sum bit circuitry 500, CSA sum bit circuitry 800 may comprise keeper circuitry and keeper-enable circuitry.

Sum bit circuitry 800 may comprise one or more precharge paths comprising one or more respectively corresponding first clocked transistors 812, one or more evaluation paths comprising both one or more respectively corresponding sets of evaluation transistors 820 and one or more second clocked transistors 816, a NAND circuitry 830, and a NAND circuitry 880.

First clocked transistors 812 may have gates coupled to a clock signal path, first terminals coupled to a first power rail 814, and second terminals coupled to one or more respectively corresponding first junction nodes 822. Second clocked transistors 816 may have gates coupled to the clock signal path, first terminals coupled to one or more respectively corresponding second junction nodes 824, and second terminals coupled to a second power rail 818. The one or more sets of evaluation transistors 820 may have gates coupled to at least one of a first number-bit input (A), an inverse first number-bit input (~A), a second number-bit input (B), an inverse second number-bit input (~B), a carry-bit input (C), and an inverse carry-bit input (~C). CSA sum bit circuitry 800 may also comprise intermediate junction nodes 826 between junction nodes 822 and portions of sets of evaluation transistors 820.

NAND circuitry 830 may have inputs coupled to the first set of first junction nodes 822, while NAND circuitry 880 may have inputs coupled to the second set of first junction nodes 822. Accordingly, NAND circuitry 830 may be operable to drive a calculated sum-bit on a sum-bit output, while NAND circuitry 880 may be operable to drive a calculated inverse sum-bit on an inverse sum-bit output.

Various elements of CSA sum bit circuitry 800 may be substantially similar to elements of CSA sum bit circuitry 500. Various elements of CSA sum bit circuitry 800 may be arranged in a manner substantially similar to the arrangement of similar elements of CSA sum bit circuitry 500.

In comparison with CSA sum bit circuitry 500, CSA sum bit circuitry 800 may comprise keeper circuitry including one or more keeper-enable transistors 832, one or more first keeper transistors 834, and one or more second keeper transistors 836. First keeper transistors 834 may respectively correspond to those of first junction nodes 822 coupled to inputs of NAND circuitry 830. Second keeper transistors 836 may respectively correspond to those of first junction nodes 822 coupled to inputs of NAND circuitry 880.

First keeper transistors 834 may have conducting channels coupled to the one or more keeper-enable transistors 832, and coupled to those of first junction nodes 822 that are coupled to inputs of NAND circuitry 830. The conducting channels of first keeper transistors 834 may thereby extend between first junction nodes 822 and keeper-enable transistors 832. First keeper transistors 834 may also have gates coupled to an output of NAND circuitry 830.

Second keeper transistors 836 may have conducting channels coupled to the one or more keeper-enable transistors 832, and coupled to those of first junction nodes 822 that are coupled to inputs of NAND circuitry 880. The conducting channels of second keeper transistors 836 may thereby extend between first junction nodes 822 and keeper-enable transistors 832. Second keeper transistors 836 may also have gates coupled to an output of NAND circuitry 880.

With respect to FIG. 9, CSA carry bit circuitry 900 may be operable to calculate a CSA carry bit and an inverse CSA carry bit. In addition, in comparison with CSA carry bit circuitry 600, CSA carry bit circuitry 900 may comprise keeper circuitry and keeper-enable circuitry.

Carry bit circuitry 910 may comprise one or more precharge paths comprising one or more respectively corresponding first clocked transistors 912, one or more evaluation paths comprising both one or more respectively corresponding sets of evaluation transistors 920 and one or more second clocked transistors 916, and a NAND circuitry 930.

First clocked transistors 912 may have gates coupled to a clock signal path, first terminals coupled to a first power rail 914, and second terminals coupled to one or more respectively corresponding first junction nodes 922. Second clocked transistors 916 may have gates coupled to the clock signal path, first terminals coupled to one or more respectively corresponding second junction nodes 924, and second terminals coupled to a second power rail 918. The one or more sets of evaluation transistors 920 may have gates coupled to at least one of a first number-bit input (A), an inverse first number-bit input (~A), a second number-bit input (B), an inverse second number-bit input (~B), a carry-bit input (C), and an inverse carry-bit input (~C).

Inverse-carry bit circuitry 960 may comprise one or more additional precharge paths comprising one or more respectively corresponding additional first clocked transistors 962, one or more additional evaluation paths comprising both one or more respectively corresponding additional sets of evaluation transistors 970 and one or more additional second clocked transistors 966, and a NAND circuitry 980.

Additional first clocked transistors 962 may have gates coupled to the clock signal path, first terminals coupled to a first power rail 964, and second terminals coupled to one or more respectively corresponding additional first junction nodes 972. Additional second clocked transistors 966 may have gates coupled to the clock signal path, first terminals coupled to one or more respectively corresponding additional second junction nodes 974, and second terminals coupled to a second power rail 968. The one or more additional sets of evaluation transistors 970 may have gates coupled to at least one of a first number-bit input (A), an inverse first number-bit input (~A), a second number-bit input (B), an inverse second number-bit input (~B), a carry-bit input (C), and an inverse carry-bit input (~C).

Various elements of CSA carry bit circuitry 900 may be substantially similar to elements of CSA carry bit circuitry 600. Various elements of CSA carry bit circuitry 900 also be arranged in a manner substantially similar to the arrangement of similar elements of CSA carry bit circuitry 600.

Some transistors 928 out of the one or more sets of evaluation transistors 920 may be shared between sets of transistors. In addition, some transistors 978 out of the one or more sets of evaluation transistors 970 may be shared between sets of transistors.

In comparison with CSA carry bit circuitry 600, CSA carry bit circuitry 900 may comprise keeper circuitry including one or more first keeper-enable transistors 932, one or more second keeper-enable transistors 982, one or more first keeper transistors 934, and one or more second keeper transistors 984. First keeper transistors 934 may respectively correspond to first junction nodes 922 coupled to inputs of NAND circuitry 930. Second keeper transistors 984 may respectively correspond to first junction nodes 972 coupled to inputs of NAND circuitry 980.

First keeper transistors 934 may have conducting channels coupled to the one or more keeper-enable transistors 932, and coupled to those of first junction nodes 922 that are coupled to inputs of NAND circuitry 930. The conducting channels of first keeper transistors 934 may thereby extend between first junction nodes 922 and keeper-enable transistors 932. First keeper transistors 934 may also have gates coupled to an output of NAND circuitry 930.

Second keeper transistors 984 may have conducting channels coupled to the one or more keeper-enable transistors 982, and coupled to those of first junction nodes 972 that are coupled to inputs of NAND circuitry 980. The conducting channels of second keeper transistors 984 may thereby extend between second junction nodes 972 and keeper-enable transistors 982. Second keeper transistors 984 may also have gates coupled to an output of NAND circuitry 980.

Figure 10:
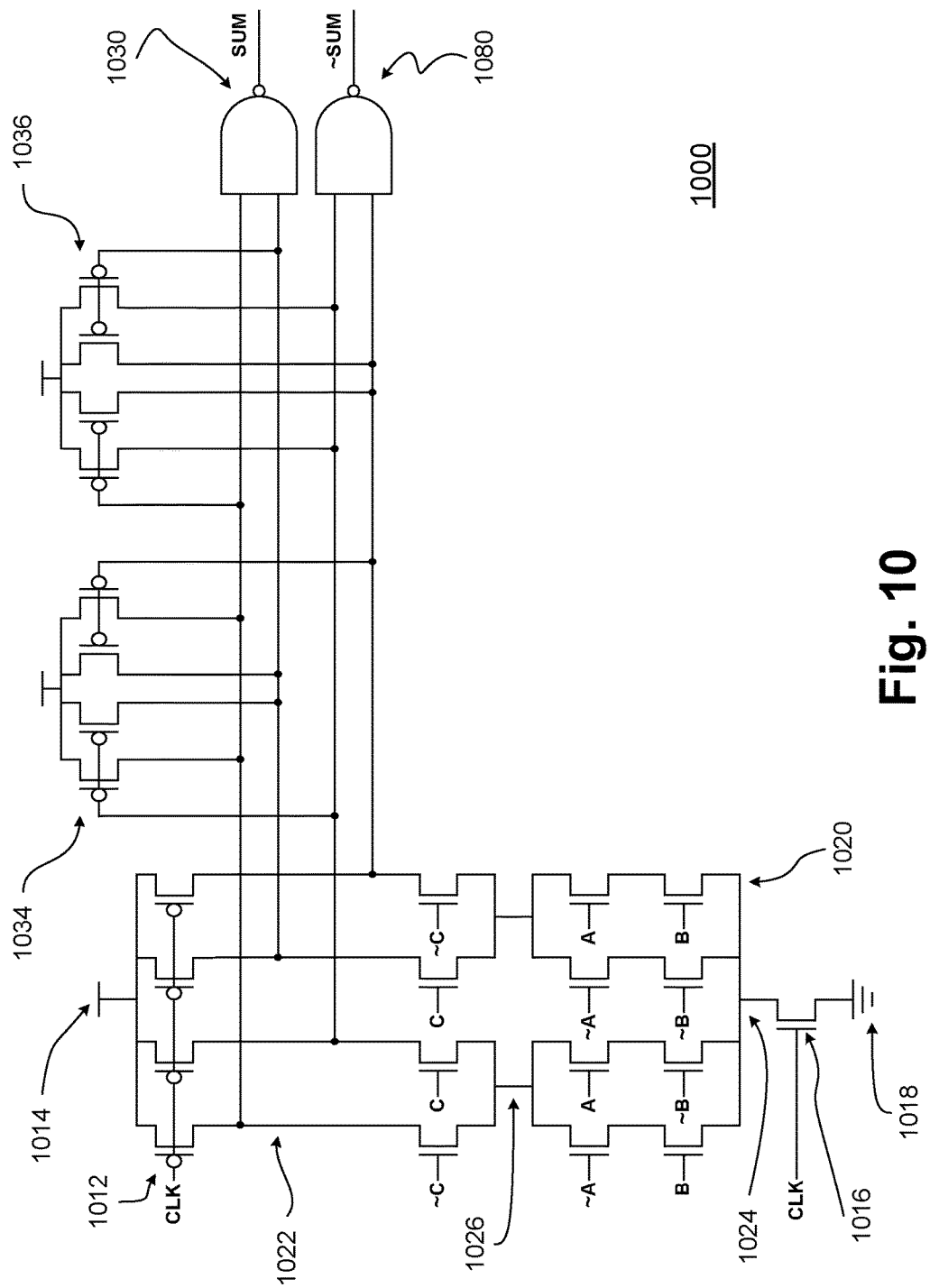
FIG. 10 illustrates dual-rail domino circuitry with cross-coupled keepers for a CSA sum bit, in accordance with some embodiments of the disclosure.
Figure 11:
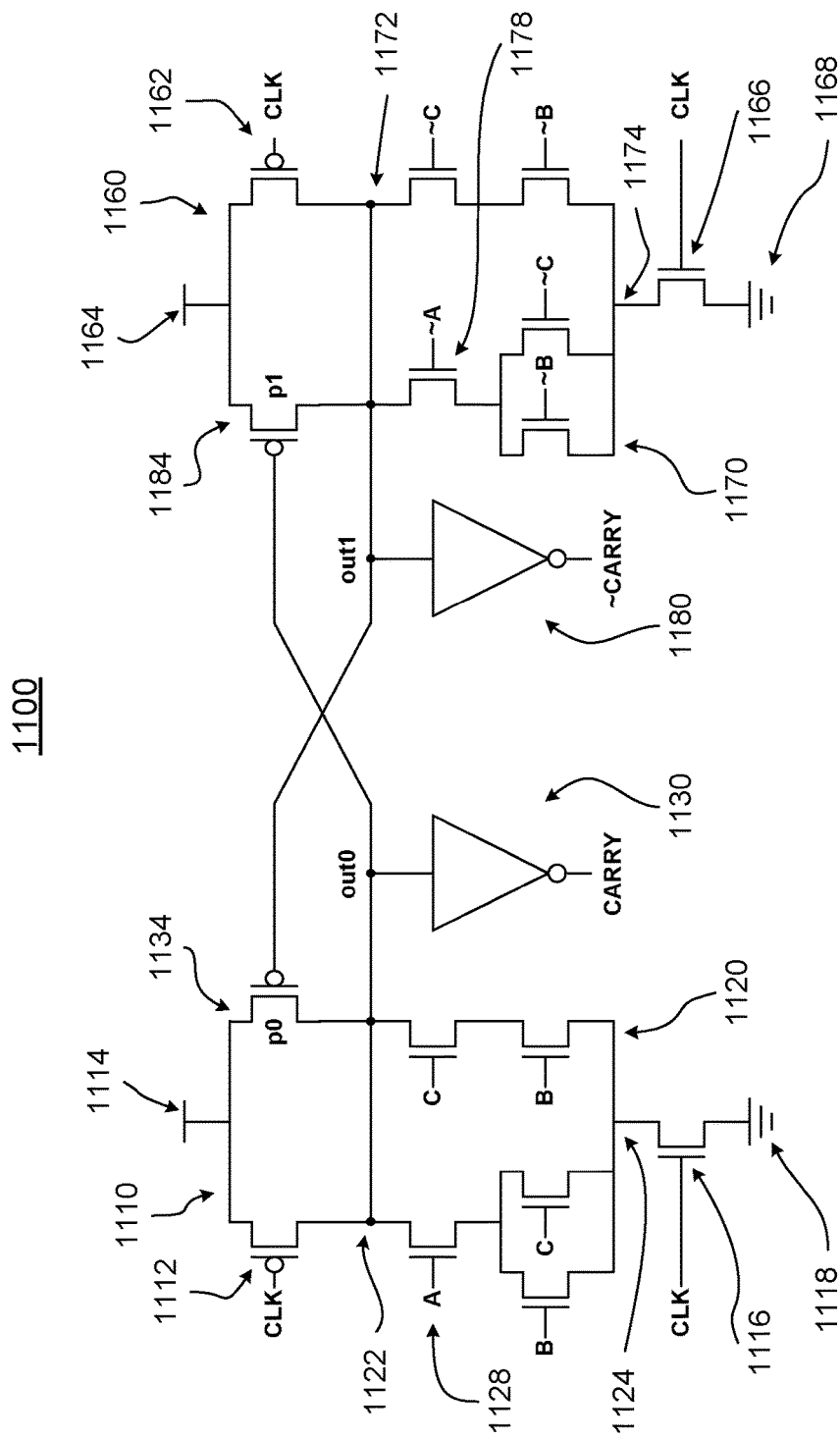
FIG. 11 illustrates dual-rail domino circuitry with cross-coupled keepers for a CSA carry bit, in accordance with some embodiments of the disclosure.

FIG. 10 illustrates dual-rail domino circuitry with cross-coupled keepers for a CSA sum bit, in accordance with some embodiments of the disclosure. FIG. 11 illustrates dual-rail domino circuitry with cross-coupled keepers for a CSA carry bit, in accordance with some embodiments of the disclosure.

Keeper contention during logic evaluation may be reduced using cross-coupled keeper circuitry. Since dual-rail domino circuitry generates both a bit for an evaluated function and a bit for an inverse of the evaluated function, an always-enabled keeper device for an evaluated function may be driven by a pull-down path of the inverse of the evaluated function, and an always-enabled keeper device for the inverse of the evaluated function may be driven by a pull-down path of the evaluated function.

With respect to FIG. 10, CSA sum bit circuitry 1000 may be operable to calculate a CSA sum bit, and an inverse CSA sum bit. In addition, in comparison with CSA sum bit circuitry 500, CSA sum bit circuitry 800 may comprise cross-coupled keeper circuitry.

Sum bit circuitry 1000 may comprise one or more precharge paths comprising one or more respectively corresponding first clocked transistors 1012, one or more evaluation paths comprising both one or more respectively corresponding sets of evaluation transistors 1020 and one or more second clocked transistors 1016, a NAND circuitry 1030, and a NAND circuitry 1080.

First clocked transistors 1012 may have gates coupled to a clock signal path, first terminals coupled to a first power rail 1014, and second terminals coupled to one or more respectively corresponding first junction nodes 1022. Second clocked transistors 1016 may have gates coupled to the clock signal path, first terminals coupled to one or more respectively corresponding second junction nodes 1024, and second terminals coupled to a second power rail 1018. The one or more sets of evaluation transistors 1020 may have gates coupled to at least one of a first number-bit input (A), an inverse first number-bit input (~A), a second number-bit input (B), an inverse second number-bit input (~B), a carry-bit input (C), and an inverse carry-bit input (~C). CSA sum bit circuitry 1000 may also comprise intermediate junction nodes 1026 between junction nodes 1022 and portions of sets of evaluation transistors 1020.

NAND circuitry 1030 may have inputs coupled to the first set of first junction nodes 1022, while NAND circuitry 1080 may have inputs coupled to the second set of first junction nodes 1022. Accordingly, NAND circuitry 1030 may be operable to drive a calculated sum-bit on a sum-bit output, while NAND circuitry 1080 may be operable to drive a calculated inverse sum-bit on an inverse sum-bit output.

Various elements of CSA sum bit circuitry 1000 may be substantially similar to elements of CSA sum bit circuitry 500. Various elements of CSA sum bit circuitry 1000 may be arranged in a manner substantially similar to the arrangement of similar elements of CSA sum bit circuitry 500.

In comparison with CSA sum bit circuitry 500, CSA sum bit circuitry 1000 may comprise cross-coupled keeper circuitry including one or more first keeper transistors 1034 and one or more second keeper transistors 1036. First keeper transistors 1034 may respectively correspond to those of first junction nodes 1022 coupled to inputs of NAND circuitry 1030. Second keeper transistors 1036 may respectively correspond to those of first junction nodes 1022 coupled to inputs of NAND circuitry 1080.

First keeper transistors 1034 may have conducting channels coupled to first power rail 1014, and coupled to those of first junction nodes 1022 that are coupled to inputs of NAND circuitry 1030. The conducting channels of first keeper transistors 1034 may thereby extend between first junction nodes 1022 and first power rail 1014. First keeper transistors 1034 may also have gates coupled to those of first junction nodes 1022 that are coupled to inputs of NAND circuitry 1080. Thus, first keeper transistors 1034 may have conducting channels coupled to inputs of NAND circuitry 1030, and may have gates cross-coupled to inputs of NAND circuitry 1080.

Second keeper transistors 1036 may have conducting channels coupled to first power rail 1014, and coupled to those of first junction nodes 1022 that are coupled to inputs of NAND circuitry 1080. The conducting channels of second keeper transistors 1036 may thereby extend between first junction nodes 1022 and first power rail 1014. Second keeper transistors 1036 may also have gates coupled to those of first junction nodes 1022 that are coupled to inputs of NAND circuitry 1080. Thus, second keeper transistors 1036 may have conducting channels coupled to inputs of NAND circuitry 1080, and may have gates cross-coupled to inputs of NAND circuitry 1030.

With respect to FIG. 11, CSA carry bit circuitry 1100 may be operable to calculate a CSA carry bit and an inverse CSA carry bit. In addition, in comparison with CSA carry bit circuitry 600, CSA carry bit circuitry 1100 may comprise keeper circuitry and keeper-enable circuitry.

Carry bit circuitry 1110 may comprise one or more precharge paths comprising one or more respectively corresponding first clocked transistors 1112, one or more evaluation paths comprising both one or more respectively corresponding sets of evaluation transistors 1120 and one or more second clocked transistors 1116, and an inverter circuitry 1130.

First clocked transistors 1112 may have gates coupled to a clock signal path, first terminals coupled to a first power rail 1114, and second terminals coupled to one or more respectively corresponding first junction nodes 1122. Second clocked transistors 1116 may have gates coupled to the clock signal path, first terminals coupled to one or more respectively corresponding second junction nodes 1124, and second terminals coupled to a second power rail 1118. The one or more sets of evaluation transistors 1120 may have gates coupled to at least one of a first number-bit input (A), an inverse first number-bit input (~A), a second number-bit input (B), an inverse second number-bit input (~B), a carry-bit input (C), and an inverse carry-bit input (~C).

Inverse-carry bit circuitry 1160 may comprise one or more additional precharge paths comprising one or more respectively corresponding additional first clocked transistors 1162, one or more additional evaluation paths comprising both one or more respectively corresponding additional sets of evaluation transistors 1170 and one or more additional second clocked transistors 1166, and an inverter circuitry 1180.

Additional first clocked transistors 1162 may have gates coupled to the clock signal path, first terminals coupled to a first power rail 1164, and second terminals coupled to one or more respectively corresponding additional first junction nodes 1172. Additional second clocked transistors 1166 may have gates coupled to the clock signal path, first terminals coupled to one or more respectively corresponding additional second junction nodes 1174, and second terminals coupled to a second power rail 1168. The one or more additional sets of evaluation transistors 1170 may have gates coupled to at least one of a first number-bit input (A), an inverse first number-bit input (~A), a second number-bit input (B), an inverse second number-bit input (~B), a carry-bit input (C), and an inverse carry-bit input (~C).

Some transistors 1128 out of the one or more sets of evaluation transistors 1120 may be shared between sets of transistors. In addition, some transistors 1178 out of the one or more sets of evaluation transistors 1170 may be shared between sets of transistors.

In comparison with CSA carry bit circuitry 600, CSA carry bit circuitry 1100 may comprise cross-coupled keeper circuitry including one or more first keeper transistors 1134 (labeled "p0") and one or more second keeper transistors 1184 (labeled "p1"). First keeper transistors 1134 may respectively correspond to first junction nodes 1122 coupled to an input of inverter circuitry 1130. Second keeper transistors 1184 may respectively correspond to first junction nodes 1172 coupled to an input of inverter circuitry 1180.

First keeper transistors 1134 may have conducting channels coupled to first power rail 1114, and coupled to those of first junction nodes 1122 that are coupled to inputs of inverter circuitry 1130. The conducting channels of first keeper transistors 1134 may thereby extend between first junction nodes 1122 and first power rail 1114. First keeper transistors 1134 may also have gates coupled to an input of inverter circuitry 1180 (labeled "out1"). Thus, first keeper transistors 1134 may have conducting channels coupled to inputs of inverter circuitry 1130, and may have gates cross-coupled to inputs of inverter circuitry 1180.

Second keeper transistors 1184 may have conducting channels coupled to first power rail 1164, and coupled to those of first junction nodes 1172 that are coupled to inputs of inverter circuitry 1180. The conducting channels of second keeper transistors 1184 may thereby extend between second junction nodes 1172 and first power rail 1164. Second keeper transistors 1184 may also have gates coupled to an input of inverter circuitry 1130 (labeled "out0"). Thus, second keeper transistors 1184 may have conducting channels coupled to inputs of inverter circuitry 1180, and may have gates cross-coupled to inputs of inverter circuitry 1130.

Accordingly, during a clock precharge phase (e.g., a precharge phase of a clock coupled to first clocked transistors 1112, second clocked transistors 1116, first clocked transistors 1162, and second clocked transistors 1166), both nodes out0 and out1 may be pulled up to a high voltage level (e.g., to a voltage level of first voltage rail 1114 and first voltage rail 1164). As nodes out0 and out1 are charged to a high voltage, both keeper device p1 and keeper device p0 may be turned off.

Subsequently, during an evaluate phase of the clock, one or more of first junction nodes 1122 or one or more of first junction nodes 1172 may be pulled down to a low voltage level (e.g., to a voltage level of second voltage rail 1116 and second voltage rail 1168). Since both keeper device p0 and keeper device p1 are turned off at the beginning of the evaluate phase, contention between the keeper devices and pull-down devices (e.g., sets of evaluation transistors 1120 and sets of evaluation transistors 1170) may be significantly reduced and may result in minimal short-circuit current.

Figure 12:
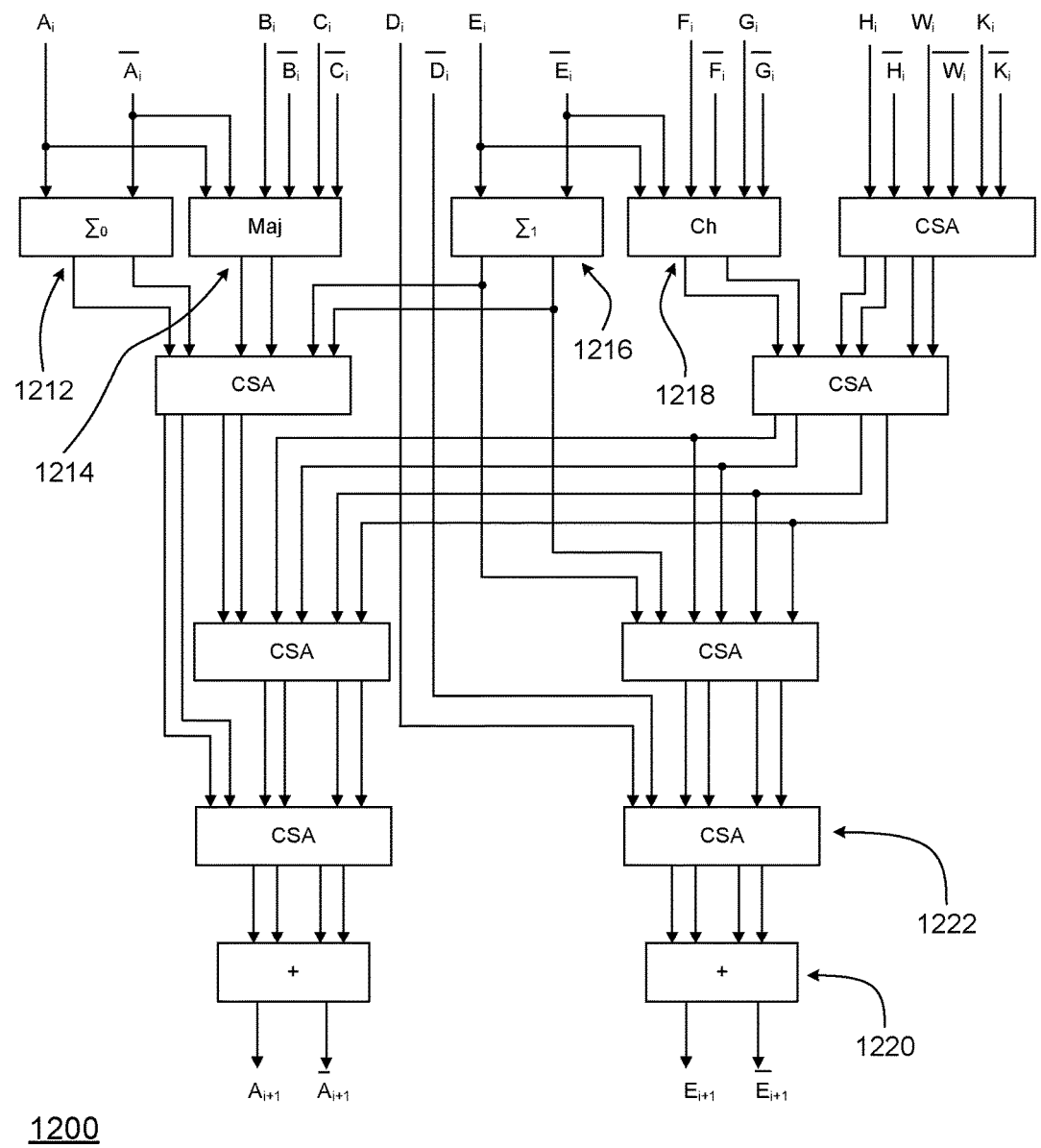
FIG. 12 illustrates a dual-rail domino SHA-256 message digest datapath, in accordance with some embodiments of the disclosure.

FIG. 12 illustrates a dual-rail domino SHA-256 message digest datapath, in accordance with some embodiments of the disclosure. A dual-rail message digest datapath 1200 may comprise: one or more first circuitries 1212, which may be operable to perform a "$\Sigma_0$" calculation; one or more second circuitries 1214, which may be operable to perform a "Maj" calculation; one or more third circuitries 1216, which may be operable to perform a "$\Sigma_1$" calculation; one or more fourth circuitries 1218, which may be operable to perform a "Ch" calculation; and/or one or more fifth circuitries 1220, which may be operable to perform a "+" calculation; and one or more sixth circuitries 1222, which may be operable to perform one or more "CSA" calculations. These operations may be performed on internal states $A_i$ through $H_i$, an expanded message word $W_i$, a round constant $W_i$, and/or on outputs of first circuitries 1212 through sixth circuitries 1222 (for example, as depicted in FIG. 12).

Various elements of dual-rail message digest datapath 1200 may be substantially similar to elements of message digest datapath 210 of FIG. 2. Various elements of dual-rail message digest datapath 1200 may be arranged in a manner substantially similar to the arrangement of similar elements of message digest datapath 210.

The computations of $A_{i+1}$ and $E_{i+1}$ may consist of successive "$\Sigma_0$" calculation, "Maj" calculations, "$\Sigma_1$" calculations, and "Ch" calculations, followed by "CSA" calculations and "+" calculations (e.g., completion adders). Dual rail message digest datapath 1200 may provide inherent latching at each logic stage for high performance and energy-efficient Bitcoin mining acceleration.

The proposed techniques for reducing keeper contention may reduce dynamic energy in the high activity SHA-256 datapath, and may reduce energy per hash. Full-custom dual-rail domino-based Bitcoin mining circuitry may provide, for example, a 56 percent energy improvement and a 33 percent performance improvement over conventional static CMOS standard-cell based designs.

Figure 13:
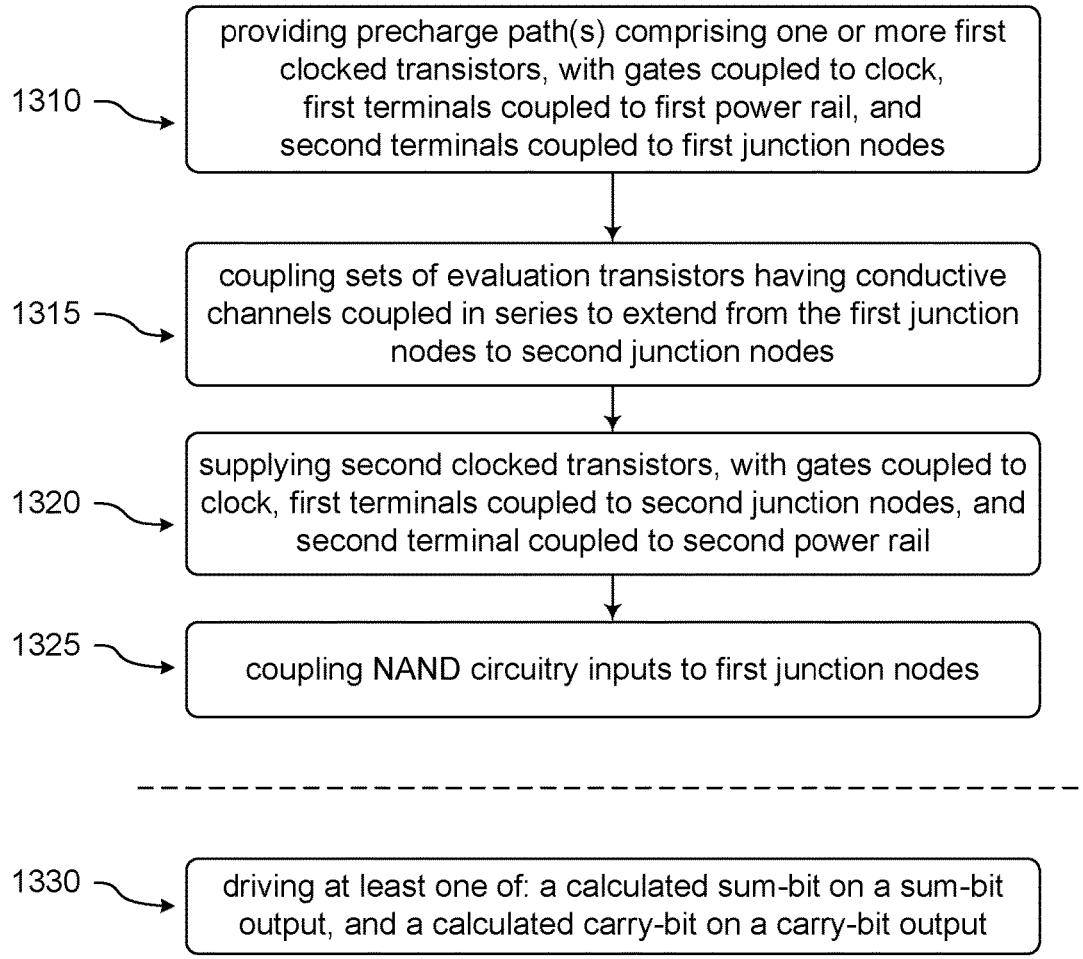
FIG. 13 illustrates methods for dual-rail keeper-less domino CSA circuitry, in accordance with some embodiments of the disclosure.

FIG. 13 illustrates methods for dual-rail keeper-less domino CSA circuitry, in accordance with some embodiments of the disclosure. A method 1300 may comprise a providing 1310, a coupling 1315, a supplying 1320, a coupling 1325, and/or a driving 1330.

In providing 1310, one or more precharge paths may be provided. The one or more precharge paths may comprise one or more respectively corresponding first clocked transistors having gates coupled to a clock signal path, first terminals coupled to a first power rail, and second terminals coupled to one or more respectively corresponding first junction nodes. The one or more precharge paths may lack a keeper circuitry. In coupling 1315, one or more sets of evaluation transistors may be coupled to have conducting channels arranged in series to extend between the one or more respectively corresponding first junction nodes and one or more second junction nodes. In supplying 1320, one or more second clocked transistors may be supplied, the one or more second clocked transistors having gates coupled to the clock signal path, first terminals coupled to the respectively corresponding one or more second junction nodes, and second terminals coupled to a second power rail. In coupling 1325, inputs of a NAND circuitry may be coupled to the one or more first junction nodes.

In some embodiments, the one or more precharge paths may extend between the first power rail and the one or more respectively corresponding first junction nodes, and may consist of the one or more respectively corresponding first clocked transistors. For some embodiments, the first power rail may be operable to carry a positive supplied voltage. In some embodiments, the second power rail may be operable to carry a ground voltage.

For some embodiments, the one or more second clocked transistors may consist of a single second clocked transistor. In some embodiments, the one or more first clocked transistors may be p-type Metal Oxide Semiconductor Field Effect Transistors (MOSFETs). For some embodiments, the one or more sets of evaluation transistors may comprise n-type MOSFETs. In some embodiments, the one or more second clocked transistors may be n-type MOSFETs.

In some embodiments, the one or more sets of evaluation transistors may have gates coupled to at least one of a first number-bit input, an inverse first number-bit input, a second number-bit input, an inverse second number-bit input, a carry-bit input, and an inverse carry-bit input. For some such embodiments, the one or more sets of evaluation transistors may be operable to calculate at least one of: Boolean product terms for a Boolean sum-of-products sum-bit calculation, and Boolean product terms for a Boolean sum-of-products carry-bit calculation. In some embodiments, in driving 1330, at least one of the following may be driven: a calculated sum-bit on a sum-bit output, and a calculated carry-bit on a carry-bit output.

Figure 14:
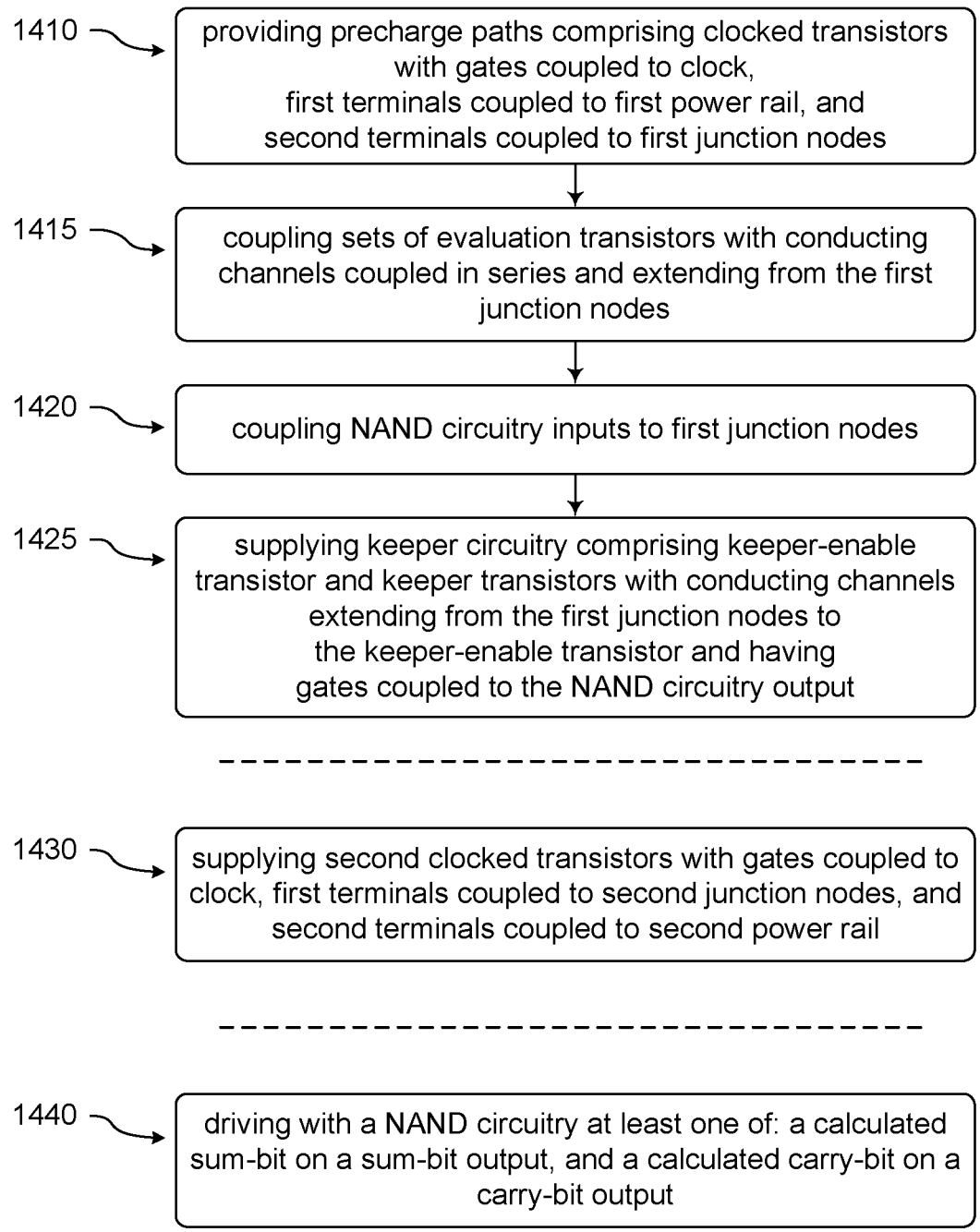
FIG. 14 illustrates methods for dual-rail domino CSA circuitry with configurable keepers, in accordance with some embodiments of the disclosure.

FIG. 14 illustrates methods for dual-rail domino CSA circuitry with configurable keepers, in accordance with some embodiments of the disclosure. A method 1400 may comprise a providing 1410, a coupling 1415, a coupling 1420, a supplying 1425, a supplying 1430, and/or a driving 1440.

In providing 1410, one or more precharge paths may be provided. The one or more precharge paths may comprise one or more respectively corresponding clocked transistors having gates coupled to a clock signal path, first terminals coupled to a first power rail, and second terminals coupled to one or more respectively corresponding first junction nodes. In coupling 1415, one or more sets of evaluation transistors may be coupled to have conducting channels arranged in series and to extend from the one or more respectively corresponding first junction nodes. In coupling 1420, inputs of a NAND circuitry may be coupled to the one or more first junction nodes. In supplying 1425, a keeper circuitry may be supplied. The keeper circuitry may comprise a keeper-enable transistor and one or more keeper transistors respectively corresponding to the one or more first junction nodes. The keeper transistors may have conducting channels coupled to the first junction nodes and coupled to the keeper-enable transistor, and may have gates coupled to an output of the NAND circuitry.

In some embodiments, the one or more clocked transistors may be first clocked transistors. For some such embodiments, in supplying 1430, one or more second clocked transistors may be supplied. The one or more second clocked transistors may have gates coupled to the clock signal path, first terminals coupled to one or more respectively corresponding second junction nodes, and second terminals coupled to a second power rail.

For some embodiments, the first power rail may be operable to carry a positive supplied voltage. In some embodiments, the second power rail may be operable to carry a ground voltage. For some embodiments, the one or more second clocked transistors may consist of a single second clocked transistor. In some embodiments, the one or more clocked transistors may be p-type Metal Oxide Semiconductor Field Effect Transistors (MOSFETs). For some embodiments, the one or more sets of evaluation transistors comprise n-type MOSFETs.

In some embodiments, the one or more sets of evaluation transistors may have gates coupled to at least one of a first number-bit input, an inverse first number-bit input, a second number-bit input, an inverse second number-bit input, a carry-bit input, and an inverse carry-bit input. For some embodiments, the one or more sets of evaluation transistors may be operable to calculate at least one of: Boolean product terms for a Boolean sum-of-products sum-bit calculation, and Boolean product terms for a Boolean sum-of-products carry-bit calculation. In some embodiments, in driving 1440, at least one of the following may be driven: a calculated sum-bit on a sum-bit output, and a calculated carry-bit on a carry-bit output.

Although the actions in the flowchart with reference to FIGS. 13-14 are shown in a particular order, the order of the actions can be modified. Thus, the illustrated embodiments can be performed in a different order, and some actions may be performed in parallel. Some of the actions and/or operations listed in FIGS. 13-14 are optional in accordance with certain embodiments. The numbering of the actions presented is for the sake of clarity and is not intended to prescribe an order of operations in which the various actions must occur. Additionally, operations from the various flows may be utilized in a variety of combinations.

In some embodiments, an apparatus may comprise means for performing various actions and/or operations of the methods of FIGS. 13-14.

Moreover, in some embodiments, machine readable storage media may have executable instructions that, when executed, cause one or more processors to perform an operation comprising the methods of FIGS. 13-14. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

Figure 15:
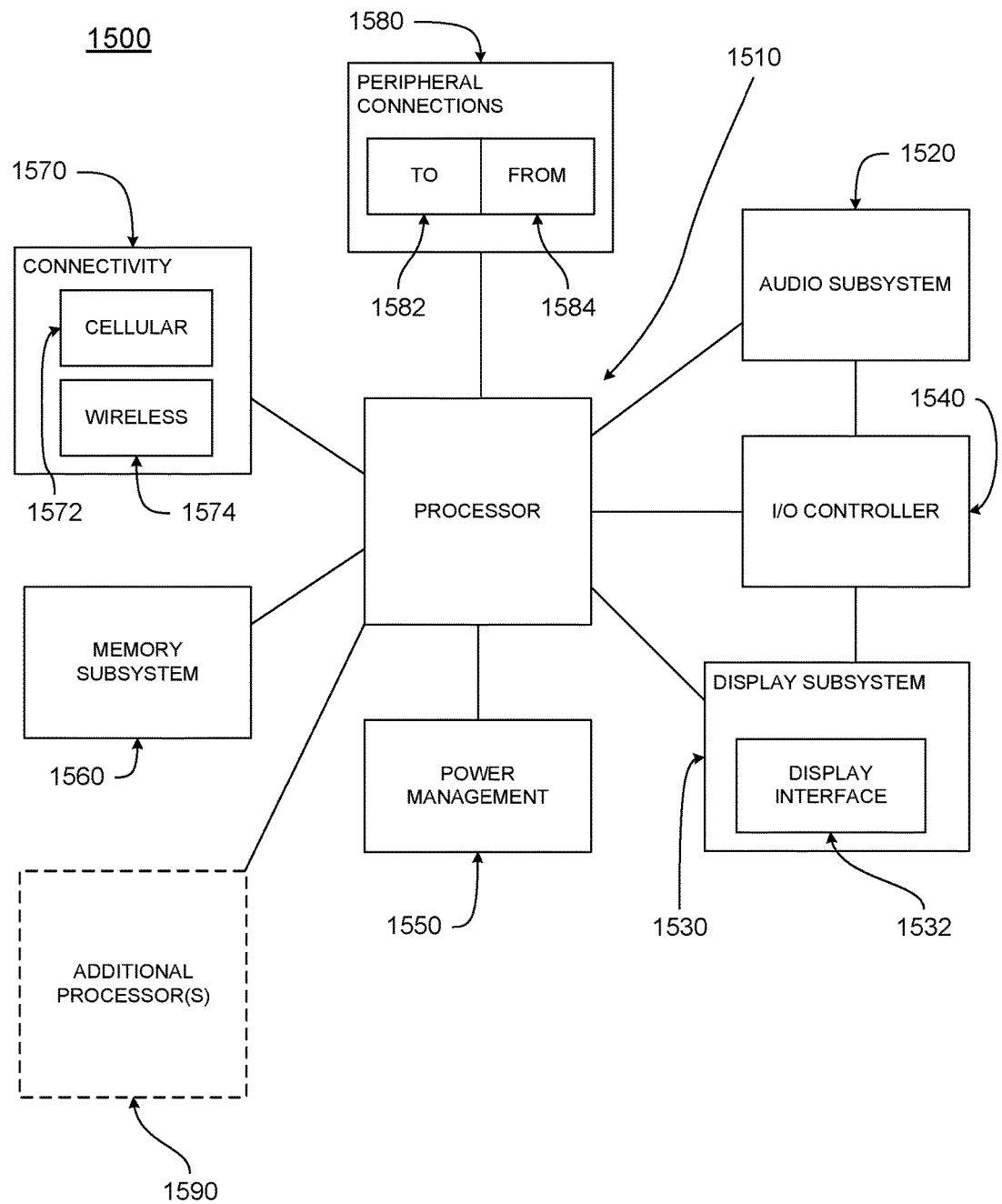
FIG. 15 illustrates a computing device with dual-rail domino style circuitry based SHA-256 datapath circuits for energy efficient Bitcoin mining, in accordance with some embodiments of the disclosure.

FIG. 15 illustrates a computing device with dual-rail domino style circuitry based SHA-256 datapath circuits for energy efficient Bitcoin mining, in accordance with some embodiments of the disclosure. Computing device 1500 may be a computer system, a System-on-a-Chip (SoC), a tablet, a mobile device, a smart device, or a smart phone with dual-rail domino style circuitry based SHA-256 datapath circuits for energy efficient Bitcoin mining, in accordance with some embodiments of the disclosure. It will be understood that certain components of computing device 1500 are shown generally, and not all components of such a device are shown FIG. 15. Moreover, while some of the components may be physically separate, others may be integrated within the same physical package, or even on the same physical silicon die. Accordingly, the separation between the various components as depicted in FIG. 15 may not be physical in some cases, but may instead be a functional separation. It is also pointed out that those elements of FIG. 15 having the same names or reference numbers as the elements of any other figure can operate or function in any manner similar to that described, but are not limited to such.

In various embodiments, the components of computing device 1500 may include any of a processor 1510, an audio subsystem 1520, a display subsystem 1530, an I/O controller 1540, a power management component 1550, a memory subsystem 1560, a connectivity component 1570, one or more peripheral connections 1580, and one or more additional processors 1590. In some embodiments, processor 1510 may include dual-rail domino style circuitry based SHA-256 datapath circuits for energy efficient Bitcoin mining, in accordance with some embodiments of the disclosure. In various embodiments, however, any of the components of computing device 1500 may include dual-rail domino style circuitry based SHA-256 datapath circuits for energy efficient Bitcoin mining, in accordance with some embodiments of the disclosure. In addition, one or more components of computing device 1500 may include an interconnect fabric having a plurality of ports, such as a router, a network of routers, or a Network-on-a-Chip (NoC).

In some embodiments, computing device 1500 may be a mobile device which may be operable to use flat surface interface connectors. In one embodiment, computing device

1500 may be a mobile computing device, such as a computing tablet, a mobile phone or smart-phone, a wireless-enabled e-reader, or other wireless mobile device. The various embodiments of the present disclosure may also comprise a network interface within 1570 such as a wireless interface so that a system embodiment may be incorporated into a wireless device, for example a cell phone or personal digital assistant.

Processor 1510 may be a general-purpose processor or CPU (Central Processing Unit). In some embodiments, processor 1510 may include one or more physical devices, such as microprocessors, application processors, microcontrollers, programmable logic devices, or other processing means. The processing operations performed by processor 1510 may include the execution of an operating platform or operating system on which applications and/or device functions may then be executed. The processing operations may also include operations related to one or more of the following: audio I/O; display I/O; power management; connecting computing device 1500 to another device; and/or I/O (input/output) with a human user or with other devices.

Audio subsystem 1520 may include hardware components (e.g., audio hardware and audio circuits) and software components (e.g., drivers and/or codecs) associated with providing audio functions to computing device 1500. Audio functions can include speaker and/or headphone output as well as microphone input. Devices for such functions can be integrated into computing device 1500, or connected to computing device 1500. In one embodiment, a user interacts with computing device 1500 by providing audio commands that are received and processed by processor 1510.

Display subsystem 1530 may include hardware components (e.g., display devices) and software components (e.g., drivers) that provide a visual and/or tactile display for a user to interact with computing device 1500. Display subsystem 1530 may include a display interface 1532, which may be a particular screen or hardware device used to provide a display to a user. In one embodiment, display interface 1532 includes logic separate from processor 1510 to perform at least some processing related to the display. In some embodiments, display subsystem 1530 includes a touch screen (or touch pad) device that provides both output and input to a user.

I/O controller 1540 may include hardware devices and software components related to interaction with a user. I/O controller 1540 may be operable to manage hardware that is part of audio subsystem 1520 and/or display subsystem 1530. Additionally, I/O controller 1540 may be a connection point for additional devices that connect to computing device 1500, through which a user might interact with the system. For example, devices that can be attached to computing device 1500 might include microphone devices, speaker or stereo systems, video systems or other display devices, keyboard or keypad devices, or other I/O devices for use with specific applications such as card readers or other devices.

As mentioned above, I/O controller 1540 can interact with audio subsystem 1520 and/or display subsystem 1530. For example, input through a microphone or other audio device can provide input or commands for one or more applications or functions of computing device 1500. Additionally, audio output can be provided instead of, or in addition to, display output. In another example, if display subsystem 1530 includes a touch screen, the display device may also act as an input device, which can be at least partially managed by I/O controller 1540. There can also be additional buttons or switches on computing device 1500 to provide I/O functions managed by I/O controller 1540.

In some embodiments, I/O controller 1540 manages devices such as accelerometers, cameras, light sensors or other environmental sensors, or other hardware that can be included in computing device 1500. The input can be part of direct user interaction, and may provide environmental input to the system to influence its operations (such as filtering for noise, adjusting displays for brightness detection, applying a flash for a camera, or other features).

Power management component 1550 may include hardware components (e.g., power management devices and/or circuitry) and software components (e.g., drivers and/or firmware) associated with managing battery power usage, battery charging, and features related to power saving operation.

Memory subsystem 1560 may include one or more memory devices for storing information in computing device 1500. Memory subsystem 1560 can include nonvolatile memory devices (whose state does not change if power to the memory device is interrupted) and/or volatile memory devices (whose state is indeterminate if power to the memory device is interrupted). Memory subsystem 1560 can store application data, user data, music, photos, documents, or other data, as well as system data (whether long-term or temporary) related to the execution of the applications and functions of computing device 1500.

Some portion of memory subsystem 1560 may also be provided as a non-transitory machine-readable medium for storing the computer-executable instructions (e.g., instructions to implement any other processes discussed herein). The machine-readable medium may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, some embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity component 1570 may include a network interface, such as a cellular interface 1572 or a wireless interface 1574 (so that an embodiment of computing device 1500 may be incorporated into a wireless device such as a cellular phone or a personal digital assistant). In some embodiments, connectivity component 1570 includes hardware devices (e.g., wireless and/or wired connectors and communication hardware) and software components (e.g., drivers and/or protocol stacks) to enable computing device 1500 to communicate with external devices. Computing device 1500 could include separate devices, such as other computing devices, wireless access points or base stations, as well as peripherals such as headsets, printers, or other devices.

In some embodiments, connectivity component 1570 can include multiple different types of network interfaces, such as one or more wireless interfaces for allowing processor 1510 to communicate with another device. To generalize, computing device 1500 is illustrated with cellular interface 1572 and wireless interface 1574. Cellular interface 1572 refers generally to wireless interfaces to cellular networks provided by cellular network carriers, such as provided via GSM or variations or derivatives, CDMA (code division multiple access) or variations or derivatives, TDM (time division multiplexing) or variations or derivatives, or other cellular service standards. Wireless interface 1574 refers generally to non-cellular wireless interfaces, and can include personal area networks (such as Bluetooth, Near Field, etc.), local area networks (such as Wi-Fi), and/or wide area networks (such as WiMax), or other wireless communication.

Peripheral connections 1580 may include hardware interfaces and connectors, as well as software components (e.g., drivers and/or protocol stacks) to make peripheral connections. It will be understood that computing device 1500 could both be a peripheral device to other computing devices (via "to" 1582), as well as have peripheral devices connected to it (via "from" 1584). The computing device 1500 may have a "docking" connector to connect to other computing devices for purposes such as managing content on computing device 1500 (e.g., downloading and/or uploading, changing, synchronizing). Additionally, a docking connector can allow computing device 1500 to connect to certain peripherals that allow computing device 1500 to control content output, for example, to audiovisual or other systems.

In addition to a proprietary docking connector or other proprietary connection hardware, computing device 1500 can make peripheral connections 1580 via common or standards-based connectors. Common types of connectors can include a Universal Serial Bus (USB) connector (which can include any of a number of different hardware interfaces), a DisplayPort or MiniDisplayPort (MDP) connector, a High Definition Multimedia Interface (HDMI) connector, a Firewire connector, or other types of connectors.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

An example provides an apparatus comprising: one or more precharge paths comprising one or more respectively corresponding first clocked transistors having gates coupled to a clock signal path, first terminals coupled to a first power rail, and second terminals coupled to one or more respectively corresponding first junction nodes, the one or more precharge paths lacking a keeper circuitry; and one or more second clocked transistors having gates coupled to the clock signal path, first terminals coupled to one or more respectively corresponding second junction nodes, and second terminals coupled to a second power rail.

Some embodiments provide an apparatus comprising: one or more sets of evaluation transistors having conducting channels coupled in series, coupled to the one or more respectively corresponding first junction nodes, and coupled to one of the one or more second junction nodes; and a NAND circuitry with inputs coupled to the one or more first junction nodes.

Some embodiments provide an apparatus wherein the one or more precharge paths extend between the first power rail and the one or more respectively corresponding first junction nodes and consist of the one or more respectively corresponding first clocked transistors.

Some embodiments provide an apparatus wherein the first power rail is operable to carry a positive supplied voltage, and the second power rail is operable to carry a ground voltage.

Some embodiments provide an apparatus wherein the one or more second clocked transistors comprise a single second clocked transistor.

Some embodiments provide an apparatus wherein the one or more first clocked transistors comprise p-type Metal Oxide Semiconductor Field Effect Transistors (MOSFETs), the one or more sets of evaluation transistors comprise n-type MOSFETs, and the one or more second clocked transistors comprise n-type MOSFETs.

Some embodiments provide an apparatus wherein the one or more sets of evaluation transistors comprise gates coupled to at least one of: a first number-bit input, an inverse first number-bit input, a second number-bit input, an inverse second number-bit input, a carry-bit input, or an inverse carry-bit input; wherein the one or more sets of evaluation transistors are operable to calculate at least one of: Boolean product terms for a Boolean sum-of-products sum-bit calculation, or Boolean product terms for a Boolean sum-of-products carry-bit calculation; and wherein the NAND circuitry is operable to drive at least one of: a calculated sum-bit on a sum-bit output, or a calculated carry-bit on a carry-bit output.

Some embodiments provide an apparatus comprising: one or more additional precharge paths lacking keeper circuitry and comprising one or more respectively corresponding additional first clocked transistors having gates coupled to the clock signal path, first terminals coupled to the first power rail, and second terminals coupled to one or more respectively corresponding additional first junction nodes; one or more additional second clocked transistors having gates coupled to the clock signal path, first terminals coupled to one or more respectively corresponding additional second junction nodes, and second terminals coupled to the second power rail; one or more additional sets of evaluation transistors having conducting channels coupled in series, coupled to the one or more respectively corresponding additional first junction nodes, and coupled to one of the one or more additional second clocked transistors; and an additional NAND circuitry with inputs coupled to the one or more additional first junction nodes.

Some embodiments provide an apparatus wherein the one or more sets of additional evaluation transistors comprise gates coupled to at least one of: a first number-bit input, an inverse first number-bit input, a second number-bit input, an inverse second number-bit input, a carry-bit input, or an inverse carry-bit input; wherein the one or more sets of additional evaluation transistors are operable to calculate at least one of: Boolean product terms for a Boolean sum-of-products inverse sum-bit calculation, or Boolean product terms for a Boolean sum-of-products inverse carry-bit calculation; and wherein the additional NAND circuitry is operable to drive at least one of: a calculated inverse sum-bit on an inverse sum-bit output, or a calculated inverse carry-bit on an inverse carry-bit output.

Some embodiments provide an apparatus wherein a first set of the one or more sets of evaluation transistors and a second set of the one or more sets of evaluation transistors share at least one evaluation transistor.

An example provides a system comprising a memory, a processor coupled to the memory, and a wireless interface for allowing the processor to communicate with another device, the system including the apparatus of various of the examples above.

An example provides a system comprising a memory, a processor coupled to the memory, and a wireless interface for allowing the processor to communicate with another device, the processor including: one or more precharge paths comprising one or more respectively corresponding first clocked transistors having gates coupled to a clock signal path, first terminals coupled to a first power rail, and second terminals coupled to one or more respectively corresponding first junction nodes, the one or more precharge paths lacking a keeper circuitry; and one or more second clocked transistors having gates coupled to the clock signal path, first terminals coupled to one or more respectively corresponding second junction nodes, and second terminals coupled to a second power rail.

Some embodiments provide a system comprising: one or more sets of evaluation transistors having conducting channels coupled in series, coupled to the one or more respectively corresponding first junction nodes, and coupled to one of the one or more second junction nodes; and a NAND circuitry with inputs coupled to the one or more first junction nodes, wherein the one or more precharge paths extend between the first power rail and the one or more respectively corresponding first junction nodes and consist of the one or more respectively corresponding first clocked transistors.

Some embodiments provide a system wherein the first power rail is operable to carry a positive supplied voltage, the second power rail is operable to carry a ground voltage, the one or more second clocked transistors comprise a single second clocked transistor, the one or more first clocked transistors comprise p-type Metal Oxide Semiconductor Field Effect Transistors (MOSFETs), the one or more sets of evaluation transistors comprise n-type MOSFETs, and the one or more second clocked transistors comprise n-type MOSFETs.

Some embodiments provide a system wherein the one or more sets of evaluation transistors comprise gates coupled to at least one of: a first number-bit input, an inverse first number-bit input, a second number-bit input, an inverse second number-bit input, a carry-bit input, or an inverse carry-bit input; wherein the one or more sets of evaluation transistors are operable to calculate at least one of: Boolean product terms for a Boolean sum-of-products sum-bit calculation, or Boolean product terms for a Boolean sum-of-products carry-bit calculation; and comprising a NAND circuitry operable to drive at least one of: a calculated sum-bit on a sum-bit output, or a calculated carry-bit on a carry-bit output.

Some embodiments provide a system one or more additional precharge paths lacking keeper circuitry and comprising one or more respectively corresponding additional first clocked transistors having gates coupled to the clock signal path, first terminals coupled to the first power rail, and second terminals coupled to one or more respectively corresponding additional first junction nodes; one or more additional second clocked transistors having gates coupled to the clock signal path, first terminals coupled to one or more respectively corresponding additional second junction nodes, and second terminals coupled to the second power rail; one or more additional sets of evaluation transistors having conducting channels coupled in series, coupled to the one or more respectively corresponding additional first junction nodes, and coupled to one of the one or more additional second clocked transistors; and a NAND circuitry with inputs coupled to the one or more additional first junction nodes.

Some embodiments provide a system wherein the one or more sets of additional evaluation transistors comprise gates coupled to at least one of: a first number-bit input, an inverse first number-bit input, a second number-bit input, an inverse second number-bit input, a carry-bit input, or an inverse carry-bit input; wherein the one or more sets of additional evaluation transistors are operable to calculate at least one of: Boolean product terms for a Boolean sum-of-products inverse sum-bit calculation, or Boolean product terms for a Boolean sum-of-products inverse carry-bit calculation; and comprising an additional NAND circuitry operable to drive at least one of: a calculated inverse sum-bit on an inverse sum-bit output, or a calculated inverse carry-bit on an inverse carry-bit output.

Some embodiments provide a system wherein a first set of the one or more sets of evaluation transistors and a second set of the one or more sets of evaluation transistors share at least one evaluation transistor.

An example provides a method comprising: providing one or more precharge paths comprising one or more respectively corresponding first clocked transistors having gates coupled to a clock signal path, first terminals coupled to a first power rail, and second terminals coupled to one or more respectively corresponding first junction nodes, the one or more precharge paths lacking a keeper circuitry; and coupling one or more sets of evaluation transistors to have conducting channels arranged in series to extend between the one or more respectively corresponding first junction nodes and one or more second junction nodes.

Some embodiments provide a method comprising: supplying one or more second clocked transistors having gates coupled to the clock signal path, first terminals coupled to the respectively corresponding one or more second junction nodes, and second terminals coupled to a second power rail; and coupling inputs of a NAND circuitry to the one or more first junction nodes, wherein the one or more precharge paths extending between the first power rail and the one or more respectively corresponding first junction nodes consist of the one or more respectively corresponding first clocked transistors.

Some embodiments provide a method wherein the first power rail is operable to carry a positive supplied voltage, the second power rail is operable to carry a ground voltage, the one or more second clocked transistors comprise a single second clocked transistor, the one or more first clocked transistors comprise p-type Metal Oxide Semiconductor Field Effect Transistors (MOSFETs), the one or more sets of evaluation transistors comprise n-type MOSFETs, and the one or more second clocked transistors comprise n-type MOSFETs.

Some embodiments provide a method wherein the one or more sets of evaluation transistors comprise gates coupled to at least one of: a first number-bit input, an inverse first number-bit input, a second number-bit input, an inverse second number-bit input, a carry-bit input, or an inverse carry-bit input; and wherein the one or more sets of evaluation transistors are operable to calculate at least one of: Boolean product terms for a Boolean sum-of-products sum-bit calculation, or Boolean product terms for a Boolean sum-of-products carry-bit calculation, and comprising: driving at least one of: a calculated sum-bit on a sum-bit output, or a calculated carry-bit on a carry-bit output.

An example provides a machine readable storage media having machine executable instructions stored thereon that, when executed, cause one or more processors to perform a method according to various of the examples above.

An example provides an apparatus comprising: means for providing one or more precharge paths comprising one or more respectively corresponding first clocked transistors having gates coupled to a clock signal path, first terminals coupled to a first power rail, and second terminals coupled to one or more respectively corresponding first junction nodes, the one or more precharge paths lacking a keeper circuitry; and means for coupling one or more sets of evaluation transistors to have conducting channels arranged in series to extend between the one or more respectively corresponding first junction nodes and one or more second junction nodes.

Some embodiments provide an apparatus comprising: means for supplying one or more second clocked transistors having gates coupled to the clock signal path, first terminals coupled to the respectively corresponding one or more second junction nodes, and second terminals coupled to a second power rail; and means for coupling inputs of a NAND circuitry to the one or more first junction nodes, wherein the one or more precharge paths extending between the first power rail and the one or more respectively corresponding first junction nodes consist of the one or more respectively corresponding first clocked transistors.

Some embodiments provide an apparatus wherein the first power rail is operable to carry a positive supplied voltage, the second power rail is operable to carry a ground voltage, the one or more second clocked transistors comprise a single second clocked transistor, the one or more first clocked transistors comprise p-type Metal Oxide Semiconductor Field Effect Transistors (MOSFETs), the one or more sets of evaluation transistors comprise n-type MOSFETs, and the one or more second clocked transistors comprise n-type MOSFETs.

Some embodiments provide an apparatus wherein the one or more sets of evaluation transistors comprise gates coupled to at least one of: a first number-bit input, an inverse first number-bit input, a second number-bit input, an inverse second number-bit input, a carry-bit input, or an inverse carry-bit input; and wherein the one or more sets of evaluation transistors are operable to calculate at least one of: Boolean product terms for a Boolean sum-of-products sum-bit calculation, or Boolean product terms for a Boolean sum-of-products carry-bit calculation, and comprising: means for driving at least one of: a calculated sum-bit on a sum-bit output, or a calculated carry-bit on a carry-bit output.

An example provides a machine readable storage media having machine executable instructions stored thereon that, when executed, cause one or more processors to perform an operation comprising: provide one or more precharge paths comprising one or more respectively corresponding first clocked transistors having gates coupled to a clock signal path, first terminals coupled to a first power rail, and second terminals coupled to one or more respectively corresponding first junction nodes, the one or more precharge paths lacking a keeper circuitry; and couple one or more sets of evaluation transistors to have conducting channels arranged in series to extend between the one or more respectively corresponding first junction nodes and one or more second junction nodes.

Some embodiments provide a machine readable storage media comprising: supply one or more second clocked transistors having gates coupled to the clock signal path, first terminals coupled to the respectively corresponding one or more second junction nodes, and second terminals coupled to a second power rail; and couple inputs of a NAND circuitry to the one or more first junction nodes, wherein the one or more precharge paths extending between the first power rail and the one or more respectively corresponding first junction nodes consist of the one or more respectively corresponding first clocked transistors.

Some embodiments provide a machine readable storage media wherein the first power rail is operable to carry a positive supplied voltage, the second power rail is operable to carry a ground voltage, the one or more second clocked transistors comprise a single second clocked transistor, the one or more first clocked transistors comprise p-type Metal Oxide Semiconductor Field Effect Transistors (MOSFETs), the one or more sets of evaluation transistors comprise n-type MOSFETs, and the one or more second clocked transistors comprise n-type MOSFETs.

Some embodiments provide a machine readable storage media wherein the one or more sets of evaluation transistors comprise gates coupled to at least one of: a first number-bit input, an inverse first number-bit input, a second number-bit input, an inverse second number-bit input, a carry-bit input, or an inverse carry-bit input; and wherein the one or more sets of evaluation transistors are operable to calculate at least one of: Boolean product terms for a Boolean sum-of-products sum-bit calculation, or Boolean product terms for a Boolean sum-of-products carry-bit calculation; and comprising: drive at least one of: a calculated sum-bit on a sum-bit output, or a calculated carry-bit on a carry-bit output.

An example provides an apparatus comprising: one or more precharge paths comprising one or more respectively corresponding clocked transistors having gates coupled to a clock signal path, first terminals coupled to a first power rail, and second terminals coupled to one or more respectively corresponding first junction nodes; one or more sets of evaluation transistors having conducting channels coupled in series and coupled to the one or more respectively corresponding first junction nodes; a NAND circuitry with inputs coupled to the one or more first junction nodes; and a keeper circuitry comprising a keeper-enable transistor and one or more keeper transistors respectively corresponding to the one or more first junction nodes, the keeper transistors having conducting channels coupled to the first junction nodes and coupled to the keeper-enable transistor and having gates coupled to an output of the NAND circuitry.

Some embodiments provide an apparatus wherein the one or more clocked transistors are first clocked transistors, comprising: one or more second clocked transistors comprising gates coupled to the clock signal path, first terminals coupled to one or more respectively corresponding second junction nodes, and second terminals coupled to a second power rail.

Some embodiments provide an apparatus wherein the first power rail is operable to carry a positive supplied voltage, and the second power rail is operable to carry a ground voltage.

Some embodiments provide an apparatus wherein the one or more second clocked transistors comprise a single second clocked transistor.

Some embodiments provide an apparatus wherein the one or more clocked transistors comprise p-type Metal Oxide Semiconductor Field Effect Transistors (MOSFETs), and the one or more sets of evaluation transistors comprise n-type MOSFETs.

Some embodiments provide an apparatus wherein the one or more sets of evaluation transistors comprise gates coupled to at least one of: a first number-bit input, an inverse first number-bit input, a second number-bit input, an inverse second number-bit input, a carry-bit input, or an inverse carry-bit input; wherein the one or more sets of evaluation transistors are operable to calculate at least one of: Boolean product terms for a Boolean sum-of-products sum-bit calculation, or Boolean product terms for a Boolean sum-of-products carry-bit calculation; and comprising a NAND circuitry operable to drive at least one of: a calculated sum-bit on a sum-bit output, or a calculated carry-bit on a carry-bit output.

Some embodiments provide an apparatus wherein the one or more clocked transistors are first clocked transistors, comprising: one or more additional precharge paths comprising one or more respectively corresponding additional first clocked transistors having gates coupled to the clock signal path, first terminals coupled to the first power rail, and second terminals coupled to one or more respectively corresponding additional first junction nodes; one or more additional sets of evaluation transistors having conducting channels coupled in series and extending from the one or more respectively corresponding additional first junction nodes; and an additional NAND circuitry with inputs coupled to the one or more additional first junction nodes.

Some embodiments provide an apparatus wherein the one or more sets of additional evaluation transistors comprise gates coupled to at least one of: a first number-bit input, an inverse first number-bit input, a second number-bit input, an inverse second number-bit input, a carry-bit input, or an inverse carry-bit input; wherein the one or more sets of additional evaluation transistors are operable to calculate at least one of: Boolean product terms for a Boolean sum-of-products inverse sum-bit calculation, or Boolean product terms for a Boolean sum-of-products inverse carry-bit calculation; and comprising an additional NAND circuitry operable to drive at least one of: a calculated inverse sum-bit on an inverse sum-bit output, or a calculated inverse carry-bit on an inverse carry-bit output.

Some embodiments provide an apparatus wherein a first set of the one or more sets of evaluation transistors and a second set of the one or more sets of evaluation transistors share at least one evaluation transistor.

An example provides a system comprising a memory, a processor coupled to the memory, and a wireless interface for allowing the processor to communicate with another device, the system including the apparatus of various of the examples above.

An example provides a system comprising a memory, a processor coupled to the memory, and a wireless interface for allowing the processor to communicate with another device, the processor including: one or more precharge paths comprising one or more respectively corresponding clocked transistors having gates coupled to a clock signal path, first terminals coupled to a first power rail, and second terminals coupled to one or more respectively corresponding first junction nodes; one or more sets of evaluation transistors having conducting channels coupled in series and coupled to the one or more respectively corresponding first junction nodes; a NAND circuitry with inputs coupled to the one or more first junction nodes; and a keeper circuitry comprising a keeper-enable transistor and one or more keeper transistors respectively corresponding to the one or more first junction nodes, the keeper transistors having conducting channels coupled to the first junction nodes and coupled to the keeper-enable transistor and having gates coupled to an output of the NAND circuitry.

Some embodiments provide a system wherein the one or more clocked transistors are first clocked transistors, comprising: one or more second clocked transistors comprising gates coupled to the clock signal path, first terminals coupled to one or more respectively corresponding second junction nodes, and second terminals coupled to a second power rail.

Some embodiments provide a system wherein the first power rail is operable to carry a positive supplied voltage, and the second power rail is operable to carry a ground voltage, the one or more second clocked transistors comprise a single second clocked transistor, the one or more clocked transistors comprise p-type Metal Oxide Semiconductor Field Effect Transistors (MOSFETs), and the one or more sets of evaluation transistors comprise n-type MOSFETs.

Some embodiments provide a system wherein the one or more sets of evaluation transistors comprise gates coupled to at least one of: a first number-bit input, an inverse first number-bit input, a second number-bit input, an inverse second number-bit input, a carry-bit input, or an inverse carry-bit input; wherein the one or more sets of evaluation transistors are operable to calculate at least one of: Boolean product terms for a Boolean sum-of-products sum-bit calculation, or Boolean product terms for a Boolean sum-of-products carry-bit calculation; and comprising a NAND circuitry operable to drive at least one of: a calculated sum-bit on a sum-bit output, or a calculated carry-bit on a carry-bit output.

Some embodiments provide a system wherein the one or more clocked transistors are first clocked transistors, comprising: one or more additional precharge paths comprising one or more respectively corresponding additional first clocked transistors having gates coupled to the clock signal path, first terminals coupled to the first power rail, and second terminals coupled to one or more respectively corresponding additional first junction nodes; one or more additional sets of evaluation transistors having conducting channels coupled in series and extending from the one or more respectively corresponding additional first junction nodes; and an additional NAND circuitry with inputs coupled to the one or more additional first junction nodes.

Some embodiments provide a system wherein the one or more sets of additional evaluation transistors comprise gates coupled to at least one of: a first number-bit input, an inverse first number-bit input, a second number-bit input, an inverse second number-bit input, a carry-bit input, or an inverse carry-bit input; wherein the one or more sets of additional evaluation transistors are operable to calculate at least one of: Boolean product terms for a Boolean sum-of-products inverse sum-bit calculation, or Boolean product terms for a Boolean sum-of-products inverse carry-bit calculation; and comprising an additional NAND circuitry operable to drive at least one of: a calculated inverse sum-bit on an inverse sum-bit output, or a calculated inverse carry-bit on an inverse carry-bit output.

Some embodiments provide a system wherein a first set of the one or more sets of evaluation transistors and a second set of the one or more sets of evaluation transistors share at least one evaluation transistor.

An example provides a method comprising: providing one or more precharge paths comprising one or more respectively corresponding clocked transistors having gates coupled to a clock signal path, first terminals coupled to a first power rail, and second terminals coupled to one or more respectively corresponding first junction nodes; coupling one or more sets of evaluation transistors to have conducting channels arranged in series and to extend from the one or more respectively corresponding first junction nodes; coupling inputs of a NAND circuitry to the one or more first junction nodes; and supplying a keeper circuitry comprising a keeper-enable transistor and one or more keeper transistors respectively corresponding to the one or more first junction nodes, the keeper transistors having conducting channels coupled to the first junction nodes and coupled to the keeper-enable transistor and having gates coupled to an output of the NAND circuitry.

Some embodiments provide a method wherein the one or more clocked transistors are first clocked transistors, comprising: supplying one or more second clocked transistors having gates coupled to the clock signal path, first terminals coupled to one or more respectively corresponding second junction nodes, and second terminals coupled to a second power rail Some embodiments provide a method wherein the first power rail is operable to carry a positive supplied voltage, and the second power rail is operable to carry a ground voltage, the one or more second clocked transistors comprise a single second clocked transistor, the one or more clocked transistors comprise p-type Metal Oxide Semiconductor Field Effect Transistors (MOSFETs), and the one or more sets of evaluation transistors comprise n-type MOSFETs.

Some embodiments provide a method wherein the one or more sets of evaluation transistors comprise gates coupled to at least one of: a first number-bit input, an inverse first number-bit input, a second number-bit input, an inverse second number-bit input, a carry-bit input, or an inverse carry-bit input; and wherein the one or more sets of evaluation transistors are operable to calculate at least one of: Boolean product terms for a Boolean sum-of-products sum-bit calculation, or Boolean product terms for a Boolean sum-of-products carry-bit calculation, and comprising: driving at least one of: a calculated sum-bit on a sum-bit output, or a calculated carry-bit on a carry-bit output.

An example provides a machine readable storage media having machine executable instructions stored thereon that, when executed, cause one or more processors to perform a method according to various of the examples above.

An example provides an apparatus comprising: means for providing one or more precharge paths comprising one or more respectively corresponding clocked transistors having gates coupled to a clock signal path, first terminals coupled to a first power rail, and second terminals coupled to one or more respectively corresponding first junction nodes; means for coupling one or more sets of evaluation transistors to have conducting channels arranged in series and to extend from the one or more respectively corresponding first junction nodes; means for coupling inputs of a NAND circuitry to the one or more first junction nodes; and means for supplying a keeper circuitry comprising a keeper-enable transistor and one or more keeper transistors respectively corresponding to the one or more first junction nodes, the keeper transistors having conducting channels coupled to the first junction nodes and coupled to the keeper-enable transistor and having gates coupled to an output of the NAND circuitry.

Some embodiments provide an apparatus wherein the one or more clocked transistors are first clocked transistors, comprising: means for supplying one or more second clocked transistors having gates coupled to the clock signal path, first terminals coupled to one or more respectively corresponding second junction nodes, and second terminals coupled to a second power rail Some embodiments provide an apparatus wherein the first power rail is operable to carry a positive supplied voltage, and the second power rail is operable to carry a ground voltage, the one or more second clocked transistors comprise a single second clocked transistor, the one or more clocked transistors comprise p-type Metal Oxide Semiconductor Field Effect Transistors (MOSFETs), and the one or more sets of evaluation transistors comprise n-type MOSFETs.

Some embodiments provide an apparatus wherein the one or more sets of evaluation transistors comprise gates coupled to at least one of: a first number-bit input, an inverse first number-bit input, a second number-bit input, an inverse second number-bit input, a carry-bit input, or an inverse carry-bit input; and wherein the one or more sets of evaluation transistors are operable to calculate at least one of: Boolean product terms for a Boolean sum-of-products sum-bit calculation, or Boolean product terms for a Boolean sum-of-products carry-bit calculation, and comprising: means for driving at least one of: a calculated sum-bit on a sum-bit output, or a calculated carry-bit on a carry-bit output.

An example provides a machine readable storage media having machine executable instructions stored thereon that, when executed, cause one or more processors to perform an operation comprising: provide one or more precharge paths comprising one or more respectively corresponding clocked transistors having gates coupled to a clock signal path, first terminals coupled to a first power rail, and second terminals coupled to one or more respectively corresponding first junction nodes; couple one or more sets of evaluation transistors to have conducting channels arranged in series and to extend from the one or more respectively corresponding first junction nodes; couple inputs of a NAND circuitry to the one or more first junction nodes; and supply a keeper circuitry comprising a keeper-enable transistor and one or more keeper transistors respectively corresponding to the one or more first junction nodes, the keeper transistors having conducting channels coupled to the first junction nodes and coupled to the keeper-enable transistor and having gates coupled to an output of the NAND circuitry.

Some embodiments provide a machine readable storage media wherein the one or more clocked transistors are first clocked transistors, the operation comprising: supplying one or more second clocked transistors having gates coupled to the clock signal path, first terminals coupled to one or more respectively corresponding second junction nodes, and second terminals coupled to a second power rail Some embodiments provide a machine readable storage media wherein the first power rail is operable to carry a positive supplied voltage, and the second power rail is operable to carry a ground voltage, the one or more second clocked transistors comprise a single second clocked transistor, the one or more clocked transistors comprise p-type Metal Oxide Semiconductor Field Effect Transistors (MOSFETs), and the one or more sets of evaluation transistors comprise n-type MOSFETs.

Some embodiments provide a machine readable storage media wherein the one or more sets of evaluation transistors comprise gates coupled to at least one of: a first number-bit input, an inverse first number-bit input, a second number-bit input, an inverse second number-bit input, a carry-bit input, or an inverse carry-bit input; and wherein the one or more sets of evaluation transistors are operable to calculate at least one of: Boolean product terms for a Boolean sum-of-products sum-bit calculation, or Boolean product terms for a Boolean sum-of-products carry-bit calculation, and the operation comprising: means for driving at least one of: a calculated sum-bit on a sum-bit output, or a calculated carry-bit on a carry-bit output.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
one or more precharge path circuitries comprising one or more respectively corresponding first clocked transistors having gates coupled to a clock signal path, first terminals coupled to a first power rail, and second terminals coupled to one or more respectively corresponding first junction nodes, the one or more precharge path circuitries lacking a keeper circuitry;
one or more second clocked transistors having gates coupled to the clock signal path, first terminals coupled to one or more respectively corresponding second junction nodes, and second terminals coupled to a second power rail; and
one or more sets of evaluation transistors having conducting channels coupled in series, coupled to the one or more respectively corresponding first junction nodes, and coupled to one of the one or more second junction nodes.

2. The apparatus of claim 1, comprising:
a NAND circuitry with inputs coupled to the one or more first junction nodes.

3. The apparatus of claim 1,
wherein the one or more precharge path circuitries extend between the first power rail and the one or more respectively corresponding first junction nodes and consist of the one or more respectively corresponding first clocked transistors.

4. The apparatus of claim 1,
wherein the first power rail is operable to carry a positive supplied voltage, and the second power rail is operable to carry a ground voltage.

5. The apparatus of claim 1,
wherein the one or more second clocked transistors comprise a single second clocked transistor.

6. The apparatus of claim 1,
wherein the one or more first clocked transistors comprise p-type Metal Oxide Semiconductor Field Effect Transistors (MOSFETs), the one or more sets of evaluation transistors comprise n-type MOSFETs, and the one or more second clocked transistors comprise n-type MOSFETs.

7. The apparatus of claim 1,
wherein the one or more sets of evaluation transistors comprise gates coupled to at least one of: a first number-bit input, an inverse first number-bit input, a second number-bit input, an inverse second number-bit input, a carry-bit input, or an inverse carry-bit input;
wherein the one or more sets of evaluation transistors are operable to calculate at least one of: Boolean product terms for a Boolean sum-of-products sum-bit calculation, or Boolean product terms for a Boolean sum-of-products carry-bit calculation; and
wherein the NAND circuitry is operable to drive at least one of: a calculated sum-bit on a sum-bit output, or a calculated carry-bit on a carry-bit output.

8. The apparatus of claim 1, comprising:
one or more additional precharge path circuitries lacking keeper circuitry and comprising one or more respectively corresponding additional first clocked transistors having gates coupled to the clock signal path, first terminals coupled to the first power rail, and second terminals coupled to one or more respectively corresponding additional first junction nodes;
one or more additional second clocked transistors having gates coupled to the clock signal path, first terminals coupled to one or more respectively corresponding additional second junction nodes, and second terminals coupled to the second power rail;
one or more additional sets of evaluation transistors having conducting channels coupled in series, coupled to the one or more respectively corresponding additional first junction nodes, and coupled to one of the one or more additional second clocked transistors; and
an additional NAND circuitry with inputs coupled to the one or more additional first junction nodes.

9. The apparatus of claim 8,
wherein the one or more sets of additional evaluation transistors comprise gates coupled to at least one of: a first number-bit input, an inverse first number-bit input, a second number-bit input, an inverse second number-bit input, a carry-bit input, or an inverse carry-bit input;
wherein the one or more sets of additional evaluation transistors are operable to calculate at least one of: Boolean product terms for a Boolean sum-of-products inverse sum-bit calculation, or Boolean product terms for a Boolean sum-of-products inverse carry-bit calculation; and wherein the additional NAND circuitry is operable to drive at least one of: a calculated inverse sum-bit on an inverse sum-bit output, or a calculated inverse carry-bit on an inverse carry-bit output.

10. The apparatus of claim 1,
wherein a first set of the one or more sets of evaluation transistors and a second set of the one or more sets of evaluation transistors share at least one evaluation transistor.

11. An apparatus comprising:
one or more precharge path circuitries comprising one or more respectively corresponding clocked transistors having gates coupled to a clock signal path, first terminals coupled to a first power rail, and second terminals coupled to one or more respectively corresponding first junction nodes;
one or more sets of evaluation transistors having conducting channels coupled in series and coupled to the one or more respectively corresponding first junction nodes;
one or more second clocked transistors comprising gates coupled to the clock signal path, first terminals coupled to one or more respectively corresponding second junction nodes, and second terminals coupled to a second power rail;
a NAND circuitry with inputs coupled to the one or more first junction nodes; and
a keeper circuitry comprising a keeper-enable transistor and one or more keeper transistors respectively corresponding to the one or more first junction nodes, the keeper transistors having conducting channels coupled to the first junction nodes and coupled to the keeper-enable transistor and having gates coupled to an output of the NAND circuitry.

12. The apparatus of claim 11, wherein the first power rail is operable to carry a positive supplied voltage, and the second power rail is operable to carry a ground voltage.

13. The apparatus of claim 11, wherein the one or more second clocked transistors comprise a single second clocked transistor.

14. The apparatus of claim 11,
wherein the one or more clocked transistors comprise p-type Metal Oxide Semiconductor Field Effect Transistors (MOSFETs), and the one or more sets of evaluation transistors comprise n-type MOSFETs.

15. The apparatus of claim 11,
wherein the one or more sets of evaluation transistors comprise gates coupled to at least one of: a first number-bit input, an inverse first number-bit input, a second number-bit input, an inverse second number-bit input, a carry-bit input, or an inverse carry-bit input;
wherein the one or more sets of evaluation transistors are operable to calculate at least one of: Boolean product terms for a Boolean sum-of-products sum-bit calculation, or Boolean product terms for a Boolean sum-of-products carry-bit calculation; and
comprising a NAND circuitry operable to drive at least one of: a calculated sum-bit on a sum-bit output, or a calculated carry-bit on a carry-bit output.

16. A system comprising a memory, a processor coupled to the memory, and a wireless interface for allowing the processor to communicate with another device, the processor including:
one or more precharge path circuitries comprising one or more respectively corresponding first clocked transistors having gates coupled to a clock signal path, first terminals coupled to a first power rail, and second terminals coupled to one or more respectively corresponding first junction nodes, the one or more precharge path circuitries lacking a keeper circuitry;
one or more second clocked transistors having gates coupled to the clock signal path, first terminals coupled to one or more respectively corresponding second junction nodes, and second terminals coupled to a second power rail; and
one or more sets of evaluation transistors having conducting channels coupled in series, coupled to the one or more respectively corresponding first junction nodes, and coupled to one of the one or more second junction nodes.

17. The system of claim 16, comprising:
a NAND circuitry with inputs coupled to the one or more first junction nodes,
wherein the one or more precharge path circuitries extend between the first power rail and the one or more respectively corresponding first junction nodes and consist of the one or more respectively corresponding first clocked transistors.

18. The system of claim 16,
wherein the first power rail is operable to carry a positive supplied voltage, the second power rail is operable to carry a ground voltage, the one or more second clocked transistors comprise a single second clocked transistor, the one or more first clocked transistors comprise p-type Metal Oxide Semiconductor Field Effect Transistors (MOSFETs), the one or more sets of evaluation transistors comprise n-type MOSFETs, and the one or more second clocked transistors comprise n-type MOSFETs.

19. The system of claim 16,
wherein the one or more sets of evaluation transistors comprise gates coupled to at least one of: a first number-bit input, an inverse first number-bit input, a second number-bit input, an inverse second number-bit input, a carry-bit input, or an inverse carry-bit input;
wherein the one or more sets of evaluation transistors are operable to calculate at least one of: Boolean product terms for a Boolean sum-of-products sum-bit calculation, or Boolean product terms for a Boolean sum-of-products carry-bit calculation; and
comprising a NAND circuitry operable to drive at least one of: a calculated sum-bit on a sum-bit output, or a calculated carry-bit on a carry-bit output.

* * * * *